(12) United States Patent
Fischler et al.

(10) Patent No.: US 12,353,490 B2
(45) Date of Patent: Jul. 8, 2025

(54) TICKETING DISPLAY BASED ON HISTORICAL TICKET DATABASE

(71) Applicant: EagleAnalytix, New York, NY (US)

(72) Inventors: Joshua Fischler, New York, NY (US);
Nolan Taormino, Miami, FL (US);
Widad Zhang, Donggang (CN)

(73) Assignee: EagleAnalytix, New York, NY (US)

( * ) Notice: Subject to any disclaimer, the term of this patent is extended or adjusted under 35 U.S.C. 154(b) by 0 days.

(21) Appl. No.: 18/068,958

(22) Filed: Dec. 20, 2022

(65) Prior Publication Data

US 2024/0202264 A1    Jun. 20, 2024

(51) Int. Cl.
*G06F 16/9537*   (2019.01)
*G06F 16/951*    (2019.01)
*G06F 16/9538*   (2019.01)

(52) U.S. Cl.
CPC ........ *G06F 16/9537* (2019.01); *G06F 16/951* (2019.01); *G06F 16/9538* (2019.01)

(58) Field of Classification Search
CPC . G06F 16/9537; G06F 16/951; G06F 16/9538
See application file for complete search history.

(56) References Cited

U.S. PATENT DOCUMENTS

| | | | |
|---|---|---|---|
| 11,276,108 B2 * | 3/2022 | Dworak | G06Q 10/02 |
| 2008/0255889 A1 | 10/2008 | Geisler et al. | |
| 2009/0216571 A1 | 8/2009 | Sunshine et al. | |
| 2017/0046635 A1 | 2/2017 | Thomas et al. | |
| 2019/0213621 A1 * | 7/2019 | Groetzinger | G06Q 30/0283 |

OTHER PUBLICATIONS

Ticket Flip Today: Ticket Flippers extension.
Ticket Flare 2021: 2021 Ticket Flip Extension.
Olivia SOS tool: Shows the showsonsale ("SOS") extension.
Real Madrid SOS: SOS extension on ticketmaster.
Ticket Flip Flare: Flare tool offers.
SH ticket Flip: Ticket Flip database or website.
SOS Sabrina on SH: SOS extension.
Ticket Flip TM: Ticket Flip Extension.
SOS TM data: SOS extension.
Ticketflip Dec. 2022: Ticketflip.

* cited by examiner

*Primary Examiner* — Loc Tran
(74) *Attorney, Agent, or Firm* — Dentons US LLP

(57) ABSTRACT

A method involves generating a historical database of ticket information by scraping at least one online ticket marketplace for a set of ticket information relating to an event, and storing that set of ticket information. The scraping and storing steps may be repeated at a predetermined interval. The method continues by generating a subset of ticket information for the event based on an input from a client device. The method further includes displaying the subset of ticket information generated. In some examples, the subset of ticket information is displayed within a dashboard interface.

19 Claims, 20 Drawing Sheets

TICKETING DISPLAY BASED ON HISTORICAL TICKET DATABASE

BACKGROUND

As Internet based online ticket marketplaces have become more accessible and easier to use, such marketplaces have become increasingly popular, to the point of replacing the primary ticket market for many potential event attendees. This is especially true now as nearly all major ticketed events utilize electronic forms of ticketing, typically utilizing some type of electronic barcode, such as a QR code, or near-field communication on an attendee's mobile phone device. With the adoption of electronic ticketing, companies hosting online secondary marketplaces have grown in size and popularity. Some estimates provide that the global secondary ticket market is over five billion dollars and forecasted to nearly double over the next five years.

Typically, professional resellers or individuals looking to buy or sell tickets online choose a favorite online marketplace, such as SeatGeek, StubHub, Ticketmaster, or VividSeats, and then proceed to list tickets for sale within the marketplace. These marketplaces commonly offer pricing suggestions to aid sellers, and some type of "best value," "best seats," or "best-selling" insight to a buyer. However, the visibility of current market conditions for a given event are limited in a number of ways. For example, the online secondary marketplaces operate independent of one another such that any reflection of supply and demand is limited to the supply and demand for the event in that marketplace, but not the broader market for just the event itself. Moreover, detailed insight into the event-wide market across various secondary market platforms, historical data, and trends are unavailable as secondary ticket marketplaces, at best, only offer a singular snapshot in time.

SUMMARY

Aspects of the methods and systems described herein address the lack of ticket market information readily available to professional ticket brokers and individual ticket buyers and sellers. The methods and systems provided generate a ticket pricing information otherwise not readily available, and then displays that information to a user via a dashboard interface. Ticket pricing information is regularly collected and stored in a historical database such that the ticket pricing information that is generated can be filtered, sorted, and analyzed over time. The methods and systems described herein provide professional ticket brokers and individual buyers and sellers additional insight into the current supply and demand for event tickets so that more informed buying and selling decisions may be made.

In one aspect, a method is disclosed. The method involves generating a historical database of ticket information by scraping at least one online ticket marketplace for a set of ticket information relating to an event, and storing that set of ticket information. The scraping and storing steps may be repeated at a predetermined interval. In some aspects, the predetermined interval may be static, such as daily, and other times may be dynamic, such as increasing as an event date nears or at the time of the event presale and onsale. The method continues by generating a subset of ticket information for the event based on an input from a client device. For example, a client device may transmit request that reflects a user preference, such as a time preference (e.g., the last week of ticket information) or a ticket preference (e.g., a preferred section or aisle at the event). In another example, the client device may be operating a plug-in or application that automatically requests information once an event webpage is accessed by the client device. The method further includes displaying the subset of ticket information generated. In some examples, the subset of ticket information is displayed within a dashboard interface. In others, the subset of ticket information is overlaid directly within the webpage of the online marketplace for the event.

The subset of ticket information generally includes information not otherwise displayed by the online ticket marketplace. For example, a total number of tickets listed for sale may be described. For an online marketplace that dual lists primary and secondary ticket listings, a number of primary listings and a number of secondary listings may be provided. Moreover, pricing information or summaries of pricing information may also be provided. For example, average, mean, or median pricing, possibly broken down by another parameter, such as section, aisle, row, seat. The subset of ticket information may be time limited to a specific range, that may be specified by a user via a client device. The subset of ticket information may be displayed in a chart, table, or other representation that conveys the information to the user. In one embodiment, the subset of ticket information may be displayed as a pricing trend line or a volume trend line that may be informative to a buyer or seller.

In another aspect, another method is described. The method includes accessing an event webpage of a website. The website is one of a set of ticket marketplace websites, and the event webpage corresponds to an event. The event webpage includes a first set of ticket data associated with the event. The first set of ticket data may include a number of tickets listed for sale, ticket identifying information (such as a section identifier, row identifier, etc.). The method further includes collecting the first set of ticket data at a predetermined interval, and then storing the collected data. The method continues by generating a second set of ticket data based on the stored first set of ticket data. The method also includes displaying the second set of ticket data within the event webpage.

In yet another aspect, a non-transitory computer-readable medium is disclosed. The medium has stored thereon program instructions that when executed by a processor cause performance of the acts of the methods described above.

In another aspect, a computing device is disclosed. The computing device includes a communication interface, a processor, and a non-transitory computer-readable medium having stored thereon program instructions that when executed by the processor cause the computing device to perform the acts of the methods described above.

These, as well as other aspects, advantages, and alternatives, will become apparent to those of ordinary skill in the art by reading the following detailed description, with reference where appropriate to the accompanying drawings.

DETAILED DESCRIPTION

I. Overview of Historical Database System

Figure 1:
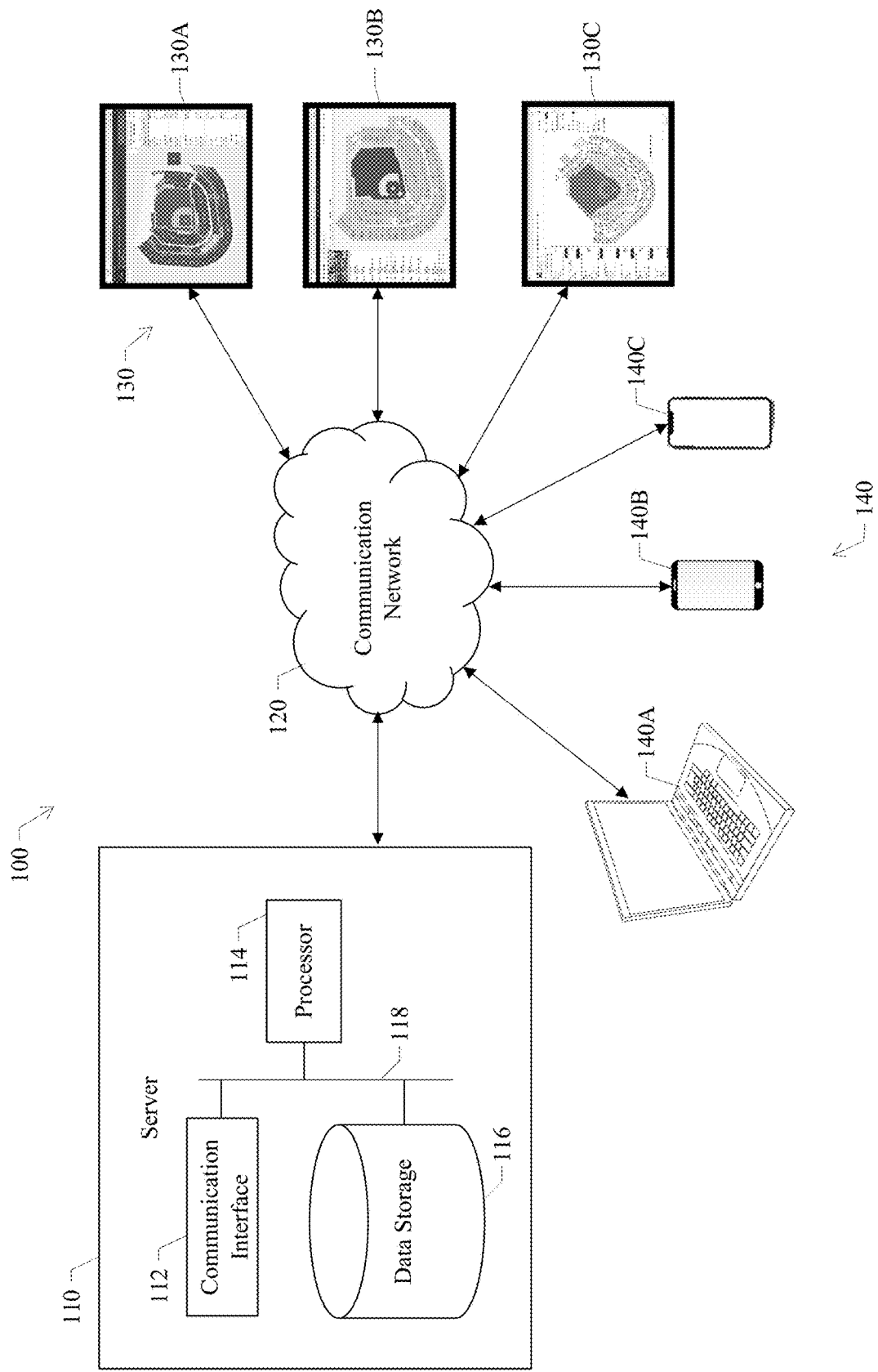
FIG. 1 is a simplified block diagram of an example system.

As noted above, various online ticket marketplaces currently exist with varying amounts of information available to a potential buyer or seller. For example, a user of a publicly available online ticket marketplace may be able to get a general sense for the current number of tickets available, and a general insight on approximate pricing or value for a single ticket in a section with other tickets publicly listed. But this information is severely limited. First, it is only available as a single snapshot in time. It tells the market participant nothing about whether prices have been increasing or decreasing, if sales volume has been increasing or decreasing, etc. Such factors are critical to an informed buying decision, especially for professional ticket brokers. Moreover, the information available through an online marketplace is usually not specific enough to be particularly informative and does not offer the user an accurate representation of the total market for a given event.

The methods and systems described herein involve the collection, storage, analysis, compilation, and/or display of ticket information, such that sales volume, pricing trends, and market conditions are quickly and efficiently made available to a buyer or seller such that the buyer or seller is able to make more informed decision. Further, data can be collected across multiple online marketplaces such that the market participant is given a better idea as to the market, rather than being exposed to a single corner thereof.

In one embodiment, a database is described. The database stores current and historical data on a selected event. The database may be accessible through a dashboard interface or dashboard. The dashboard may be available as a stand-alone application, portal, or website accessible to subscribers. In another example, the dashboard may be available as an extension or application that operates within another application, such as within a web browser. In this latter example, the extension may access information stored and generated within the database, and display it within the host application, such as within the web browser. The database may physically be located within a computing device, such as a server that is remotely accessible over a communications network, such as the Internet.

In some example embodiments, a user of the database may search for an event using the dashboard. Within the dashboard, the user may see the total query results and either save all matching events with a click of a button or save each event individually. From here, the user may also filter to a specific website, instantly get current data on the event including number of tickets available on the primary and secondary markets, and some key attributes such as the lowest price, median or average price, or look at historical data from the event, including total tickets released at given price tiers and sections and total sales data from the primary and secondary markets.

The current or instant data available to a user of the database dashboard would include statistics on a given event, including primary ticket count, primary minimum/maximum price, resale count, resale minimum/maximum price, platinum/handicap count, and total tickets, among other possibilities. The dashboard may provide a breakdown of the seat data of each section, minimum/maximum price, ticket type, and count.

As noted herein, the database also provides a user with historical data for a given event. When viewing an events history, the user can toggle between a list of daily pulls (scheduled data grabs at a user defined time each day) and special pulls (higher frequency pulls, which can be on demand). The database dashboard is also configured to organize historical data into charts or graphs which can be customized by the user. The historical data may also be organized into various tables with data including primary ticket counts, primary minimum price, resale ticket counts, resale minimum price, platinum/handicap seats, and total tickets, among other options.

The database is configured to pull or scrape data from publicly available online ticket marketplaces. The pulling or scraping operation is configured to allow for increased rate of collection during peak, predetermined times. For example, it may be desirable to increase frequency of data pulls as the start of an event gets closer, as well as during presale and/or initial on-sale time periods. Thus, some predetermined interval may be set based on the timing of the event and related timepoints. In some examples, the database and underlying system will adjust the frequency of data pulls automatically, but also allows the user to dynamically choose or customize the frequency of data pulls.

The database is further configured to track the date and time of each presale and general sale, and begins storing information as soon as tickets are released. By initiating data pulls at an early stage, the database may give an accurate starting ticket count. Having initial insight into the starting ticket count may be pivotal to the overall analysis so the user can make an accurate and informed decision as to what amount of tickets may not have been yet released and/or predict what the public ticket release amount will be.

The dashboard may allow a user to toggle between active events (which have not yet occurred) and inactive events (which have passed). Viewing inactive events may provide the ability to see how an artist, team, or venue has performed in the past, giving a user the ability to draw informed conclusions on an upcoming event before it goes on sale, or compare an active and inactive event to predict future price movement. The dashboard or portal may include additional functionality such as tracking an artist on tour and or a team during a given season or segment of time (e.g. a road trip or winning streak), such that pricing trends and information related to a given tour or segment of time may also be tracked. Such conclusions may be based on a variety of factors such as the supply on a certain date or the minimum or average price on said date.

The database may further include software that analyzes data scraped from one or more online ticket marketplaces. First, the database may analyze sales data by tracking active listings and recognize when a listing is no longer available, and then record the last known price as a sales price. That last known price may be checked for consistency with the general pricing trends based on the section, row, and seat quantity, for example, to confirm that the most likely reason for the listing no longer being available is that it was a sale, as opposed to being removed for some other reason. For example, the database attempts to filter out noise like a $6,000 ticket in a section where most tickets are listed for $100. The software considers other parameters such as whether that $6,000 ticket (for example), is in the first row which historically would have much higher pricing over the rest of the section.

The database software logic may also determine if a sale or listing was speculative-essentially a listing that may be a "fake naked short" in which the seller does not own the inventory they are promising to deliver. Sometimes such a listing is removed, typically near the presale of the event, which might otherwise look like a sale to the system, but the logic recognizes the potential as a fake naked short and removes it from the sales data, limiting potentially erroneous information from affecting the larger trends.

Finally, the database software further attempts to limit erroneous sales data by determining if a listing is simply being taken down or "unbroadcast," only to resurface at some point later (which would imply either a hold was placed on the ticket by a marketplace, or a broker purchased with the intention on flipping/selling higher).

The database system may also include additionally functionality, such as notifying subscribers or users to new events as they go on sale or presale. The database may notify users of sales volume to alert them to opportunities or changes in market conditions. A variety of notification filters may be offered and may be designed to allow the user to further filter high priority notifications such as a prediction of zero tickets before an event, less than 15% of venue capacity, unusual movement, fast daily movement, superfast daily, and improving or degrading event score. These notifications may be run at predetermined intervals, such as daily, as well as in real-time throughout the day in order to draw the attention of the user to events based on these changes and ticket movement.

II. Example System

FIG. 1 is a simplified block diagram of an example system 100 in which aspects of the present disclosure can be implemented. As shown, the system 100 includes a server 110, a plurality of websites 130, and a plurality of client devices 140. The server 100, the plurality of websites 130, and the plurality of client devices 140 are configured to communicate with each other via a communication network 120.

The server 110 may be configured for performing a variety of functions, such as those described in this disclosure (including the accompanying drawings). For example, the server 110 may be configured to scrape or pull data from one or more of the plurality of websites 130. Moreover, the server 110 may be configured to communicate with the plurality of client devices 140. The server 110 may be configured to display aspects, analyses, compilations, or subsets of the data pulled from the plurality of websites 130 to the plurality of client devices 140.

The server 110 may take a variety of forms and may include various components, including, for example, a communication interface 112, a processor 114, and a data storage 116, all of which may be communicatively linked to each other via a system bus, network, or other connection mechanism 118. While the server 110 is shown as a single unit, it should be appreciated that various functions may be spread across multiple servers with various physical and virtual arrangements without departing from the scope of this disclosure.

The communication interface 112 may take a variety of forms and may be configured to allow the server 110 to communicate with one or more devices according to any number of protocols. For instance, the communication interface 112 may be configured to allow the server 110 to communicate with the client devices 140 or the websites 130 via the communication network 120. In one example, the communication interface 112 may take the form of a wired interface, such as an Ethernet interface. As another example, the communication interface 112 may take the form of a wireless interface, such as a cellular or Wi-Fi interface.

The processor 114 may include a general purpose processor (e.g., a microprocessor) and/or a special purpose processor (e.g., a digital signal processors (DSP)).

The data storage 116 may include one or more volatile, non-volatile, removable, and/or non-removable storage components, such as magnetic, optical, or flash storage, and may be integrated in whole or in part with the processor 116. Further, the data storage 116 may take the form of a non-transitory computer-readable storage medium, having stored thereon program instructions (e.g., compiled or non-compiled program logic and/or machine code) that, when executed by the processor 114, cause the server 110 to perform one or more functions, such as those described in this disclosure.

The plurality of client devices 140 may be configured for performing a variety of functions such as those described in this disclosure. For example, the client devices 140 may transmit requests from a user to one or both of the server 110 or the plurality of websites 130. The requests transmitted by the client device 140 may include preferences, such as seating/ticketing preferences, pricing preferences, timing preferences, or a variety of other possible preferences. Each of the plurality of client devices 140 may take a variety of forms, such as a computer, a laptop (e.g., client device 140A), a mobile phone (e.g., client device 140B and client device 140C), a tablet, a media player, a gaming device, a wearable device, a vehicle, or other computing device configured to access and transmit information over the communication network 120.

The client may include various components known in the art (and not depicted in the Figures), including, for example, a user interface, a communication interface, a processor, and a data storage, all of which may be communicatively linked with each other via a system bus, network, or other connection mechanism.

The user interface of the plurality of client devices 140 may be configured for facilitating interaction between one of the client devices 140 and a user of the client device 140, such as by receiving input from the user and providing output to the user. Thus, the user interface may include input components such as a computer mouse, a keyboard, a touch-sensitive panel, or perhaps a microphone for receiving voice commands. In addition, the user interface may include output components such as a display screen (which, for example, may be combined with a touch-sensitive panel) a sound speaker or other audio output mechanism, and a haptic feedback system.

The communication interface of the plurality of client devices 140 may take a variety of forms and may be configured to allow the plurality of client devices 140 to communicate with one or more devices according to any number of protocols. For instance, the communication interface may be configured to allow the plurality of client devices 140 to communicate with the server 110 or the plurality of websites 130 via the communication network 120. Further, the communication interface of the plurality of client devices 140 may take the form of a wired or wireless interface.

The processor of the plurality of client devices 140 may include a general purpose processor and/or a special purpose processor. The data storage of the plurality of client devices 140 may include one or more volatile, non-volatile, removable, and/or non-removable storage components, and may be integrated in whole or in part with the processor. Further, the data storage of the plurality of client devices 140 may take the form of a non-transitory computer-readable storage medium, having stored thereon program instructions that, when executed by the processor, cause the plurality of client devices 140 to perform one or more functions, such as those described in this disclosure. Such program instructions may define or be part of a discrete software application, such a native app or web app, that can be executed upon user request for instance.

Each of the plurality of websites 130 may host information representative of an online ticket marketplace, among other functions. For example, each of the plurality of websites 130 may be websites such as those hosted by Ticketmaster (https://www.ticketmaster.com/), AXS (https://www.axs.com/), StubHub (https://www.stubhub.com/), Vividseats (https://www.vividseats.com/), SeatGeek (https://seatgeek.com/), TickPick (https://www.tickpick.com/), TicketNetwork (https://www.ticketnetwork.com/), Evenue (various), Pacolian (various), Hollywood (https://www.hollywoodbowl.com/) or Telecharge (https://www.telecharge.com/), among other possibilities. Each of the plurality of websites 130 may comprise a plurality of event webpages. Each event webpage may offer tickets for a certain event for purchase. Moreover, each of the plurality of websites 130 may allow a user to list tickets for sale. Each event webpage of the plurality of websites 130 may display or otherwise host ticket data associated with the event.

Generally, the communication network 120 may be configured to allow the server 110, the plurality of client devices 140, and the plurality of websites 130, to communicate with each other using any number of protocols. In addition, the communication network 120 may take a variety of forms, including for example a packet-switched network such as the Internet.

III. Example Operations

Methods of this disclosure will not be described principally in connection with providing market conditions and data to a ticket market participant who is a user of one of the plurality of client devices 140. The market conditions and data provided to the user is not easily or readily available by viewing the online ticket marketplace, such as those portrayed in one or more of the plurality of websites 130. Thus, the methods of this disclosure utilize a historical database of ticket information hosted by a server, such as the server 110, in order to generate the additional data, including market conditions, for the user to make a more informed buying or selling decision. Especially in the case of professional ticket brokers, this additional insight into the market may be critical in making profitable decisions at a larger scale than individual market participants. Nonetheless, the value to individuals will also be apparent to those of skill in the art.

Figure 2:
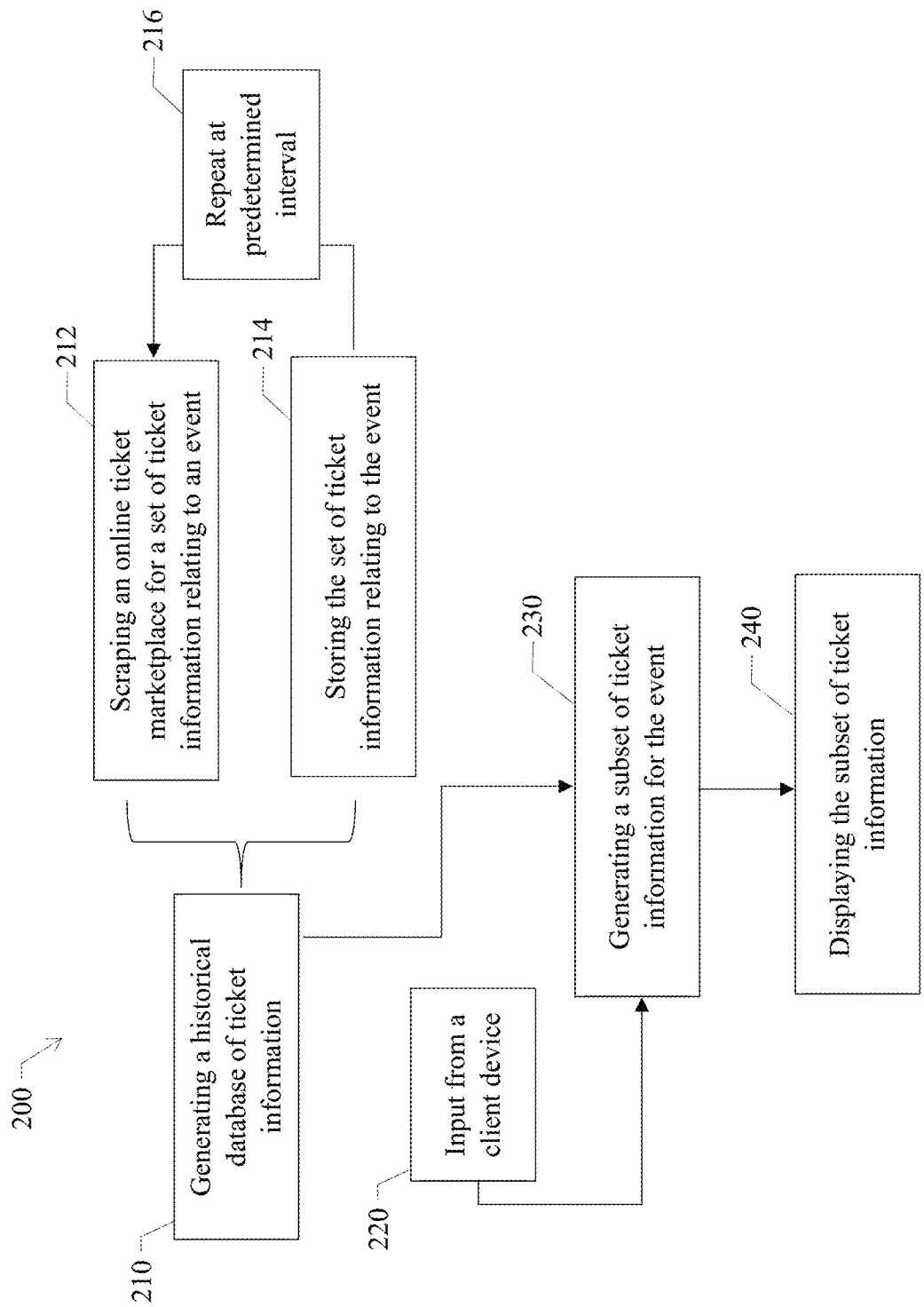
FIG. 2 is a flow chart depicting acts of an example method.

FIG. 2 is a flow chart depicting functions or actions that can be carried out in an example method 200 for providing a generated subset of ticket information to a user, wherein the subset of ticket information is based on a historical database of ticket information.

Block 210 describes generating a historical database of ticket information. The historical database of ticket information may provide data and/or statistics on ticket information as a function of time. Generating the historical database of ticket information may include one or more collection steps wherein data from one or more online ticket marketplaces is collected or pulled from event webpages that correspond to a ticketed event.

In at least one embodiment, a server generates a historical database of ticket information for an event. As one example, the server generates the historical database of ticket information for the event by scraping an online ticket marketplace for a set of ticket information relating to the event as shown in block 212. As provided by block 214, then the server stores the set of ticket information. The scraping and storing are repeated at a predetermined interval as provided in block 216. The predetermined interval may be dependent upon one or more of a variety of time parameters. For example, the predetermined interval may be smaller, i.e., more frequent data pulls, at one or more periods of time. For example, during a presale period, during an initial on-sale period (e.g., the first eight hours ticket are for sale, or the first three days tickets are for sale), or as the event start approaches (e.g., the week leading up to the event, or the three days prior to an event, or eight hours before the event is scheduled to begin), the server may increase the frequency of data pulls from one or more online ticket marketplaces. Other parameters may also alter the predetermined interval. For example, a outlier event, such as a pricing spike or pricing drop outside an expected pricing range may trigger an increase in frequency, or similarly, a spike or drop in volume may trigger an increase in frequency. Adjusting the predetermined interval of data pulls allows for better representation of market conditions to market participants.

Block 230 describes generating a subset of ticket information for the event. The subset of ticket information is generated from the historical database of ticket information. It should be appreciated that in some instances, for example when the sample size remains small, the subset of ticket information for the event may include all entries for the given event within the historical database. In other regards, the subset of ticket information for the event may be less than all information within the historical database for the given event. The subset may be time limited, price limited, section limited, etc. As illustrated, generating a subset of ticket information for the event may be based on an input from a client device as provided in block 220. The input from the client device may include one or more of variety of potential inputs.

In one example, the input from the client device may be a selection of the event within the historical database. In other example, the input may include a ticket preference or a price preference. A ticket preference may be a specific section, or group of sections, that is of interest to the user of the client device. The ticket preference may also be a specific row, aisle, or seat, among other examples. The pricing preference may be a range of prices, a maximum price, or a minimum price, among other examples. The input may include a time limitation, such as seeing the daily ticket history for the last three days or the last week, or other time period of interest to the user.

In another specific example, the input from the client device may cause the generation of the subset of ticket information. For example, the input may include causing an application or other software to execute, thereby initiating or otherwise generating the subset of information from the historical database. In other examples, the input from the client device may include format or display preferences, such as choosing to display the subset of information generated in a particular manner. In such an instance, the format or display preferences may limit the size or scope of the subset of ticket information generated by the server.

In yet other examples, scraping the online ticket marketplace for a second set of ticket information, and then storing the second set of ticket information, may both be based on the input from the client device. For example, the input from the client device may be a request from a user to collect and store the most current data available. In another example, the input from the client device may not directly request a second set of ticket information, but the system may undertake the task nonetheless in view of the input. For example, if the input is to view a certain event, based on the interest shown by the user in selecting the event, the system may go scrape and store the most current data available for that event automatically.

At block 240, the method 200 includes displaying the subset of ticket information. In some examples, the server may cause the display of the subset of ticket information. In one example embodiment, the client device may have access to a stand-alone dashboard interface for displaying the generated subset of data. For example, the user of the client device may have a subscription or other log-in credential to gain access to viewing the historical database or subset of ticket information generated therefrom. This may take the form of a website separate and apart from the online ticket marketplace websites.

In other example, a dashboard interface may be displayed on a client device while viewing the webpage for the event as part of one of the websites for one of the online ticket marketplace websites. For example, an application or software may be configured to be executed such that the subset of ticket information is displayed as part of the webpage, within the webpage, or in a dashboard within the Internet browser, among other examples. Displaying the subset of ticket information may come in a variety of forms, as described in further detail herein.

Figure 3:
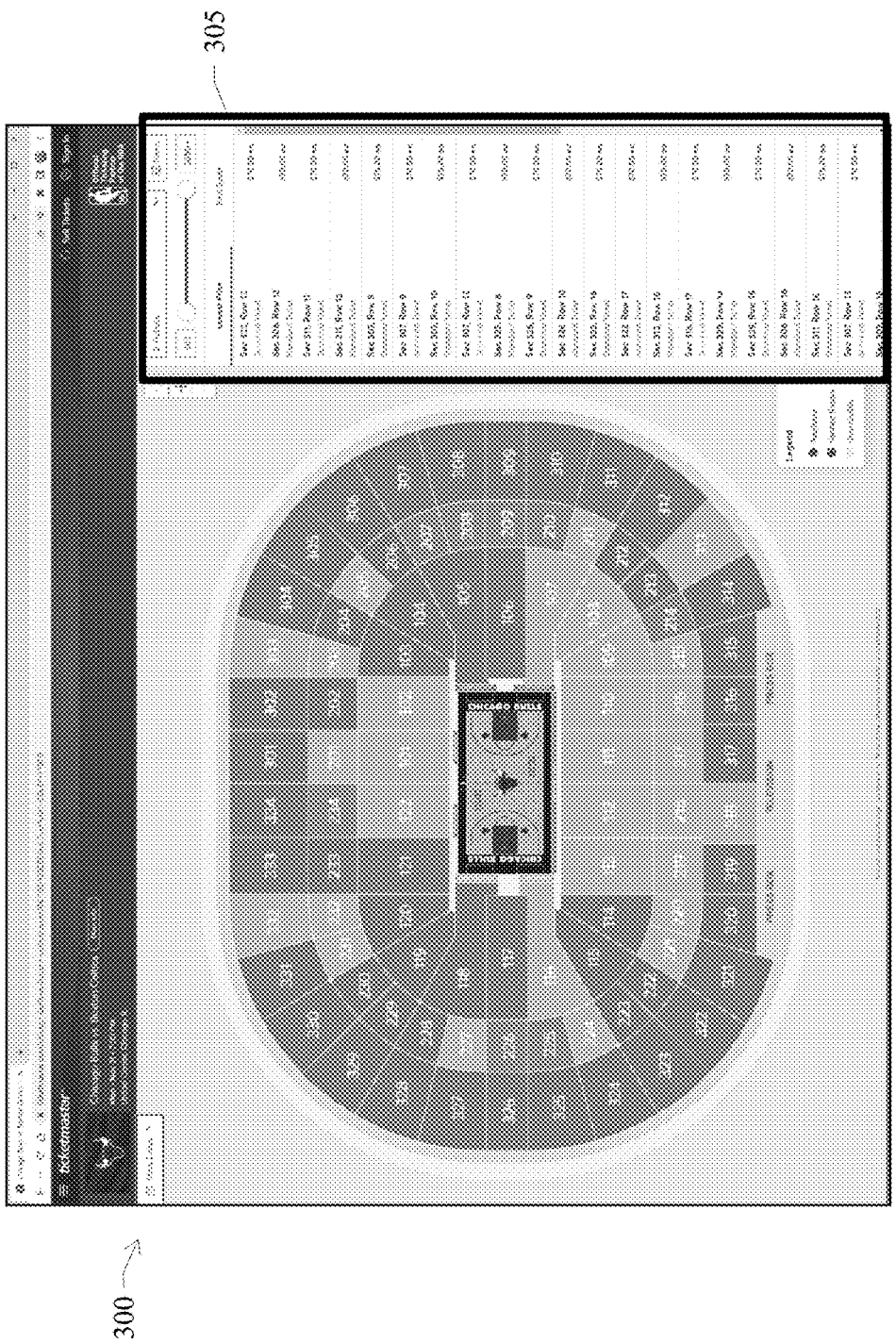
FIG. 3 is an illustration of an online ticket marketplace for an event.

FIG. 3 illustrates a webpage 300 from an online ticket marketplace for a particular event. In the specific example, the event is a basketball game, but other sporting events, concerts, theatrical events, among a variety of others events are contemplated. The online ticket marketplace is Ticketmaster, and the webpage 300 provides a representation of the tickets available for sale for the event. In particular, a ticket listing 305 providing certain information is provided. The ticket listing 305 may include a set of ticket information relating to the event. For example, the ticket listing 305 may include information such as a section identifier (e.g., a section number), an aisle or row identifier, or similar ticket location identifier for each ticket listed for sale. The ticket listing 305 may also include an offered sale price for each ticket listed for sale. While it may not be readily available to the user of a client device viewing the webpage 300, the set of ticket information from the website 300 may further include a number of a plurality of tickets for sale on the online ticket marketplace for the event. In some examples, the server may need to count or collect the number of tickets because it is not readily available to the user.

In some examples, the online ticket marketplace may include both primary and secondary ticket listings. For example, the webpage 300 is a Ticketmaster event webpage, and Ticketmaster is commonly a primary ticket source (i.e., selling directly from the host of the event) as well as a reseller. It should be understood that other online marketplaces may be limited to secondary ticket sales only, without departing form the scope of this disclosure.

The webpage 300 fails to provide a user viewing the webpage via a client device with information that may be important or critical to the user when considering buying or selling one or more tickets to the event. For example, the only way to know the number of tickets listed on the webpage 300 would be to manually count them, which would be inefficient and take up valuable time. Similarly, pricing information such as average pricing is not available. Sales volume information, such as the number of tickets listed for sale over time is also not readily available from viewing the webpage 300. Moreover, the webpage 300 is only a single marketplace, while other online marketplaces may have listings for the same event. Thus, any count of the number of tickets available would only be a portion of the total market for the event. Moreover, the ticket listing 305 is a status representation of the tickets that are available at the moment the user views the website. No historical information, such as how many tickets were available the day before, or whether pricing for the event is generally increasing or decreasing over time, is provided by website 300 in FIG. 3. Other information not readily available or not displayed to the user would be readily apparent to a person of skill.

Figure 4A:
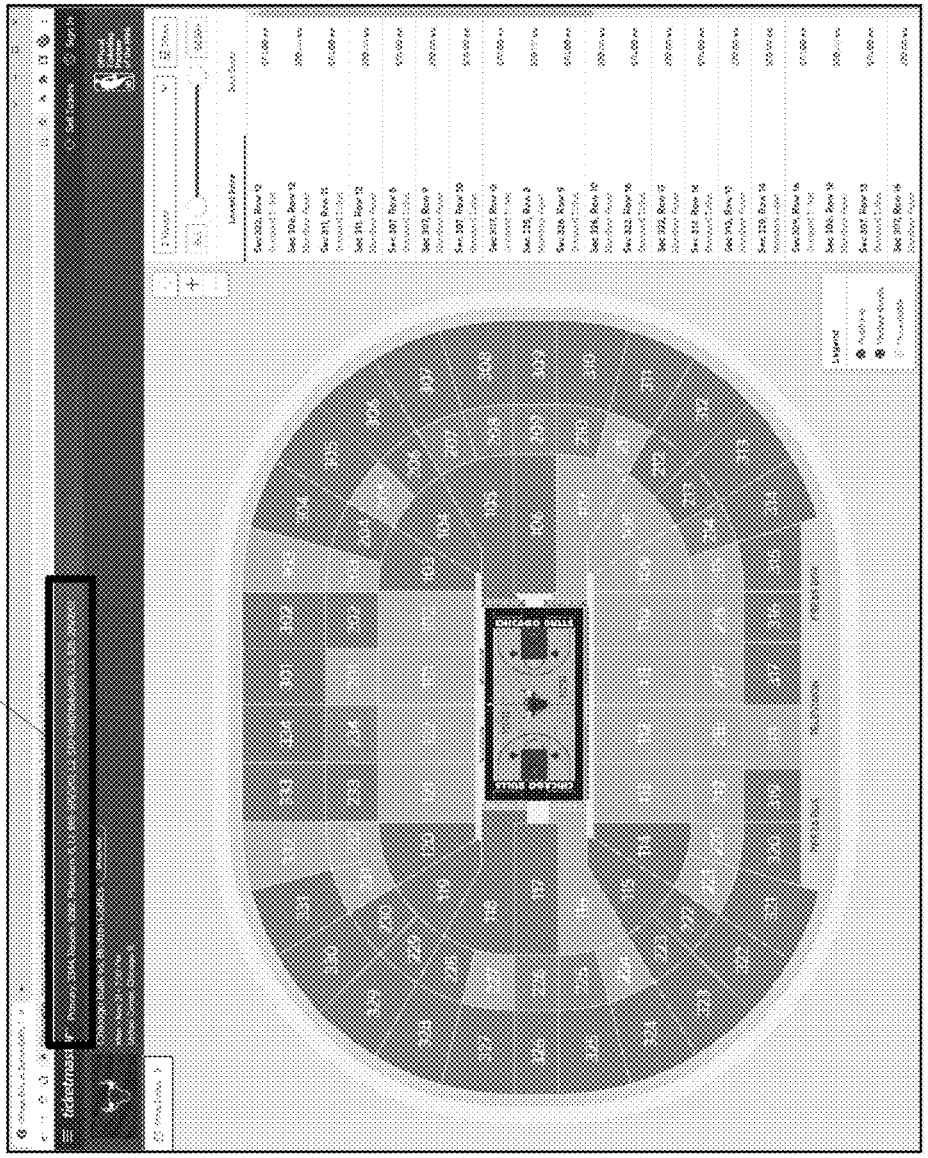
FIG. 4A is an illustration of the online ticket marketplace of FIG. 3 utilizing aspects of the methods and systems described herein, according to an example embodiment.
Figure 4B:
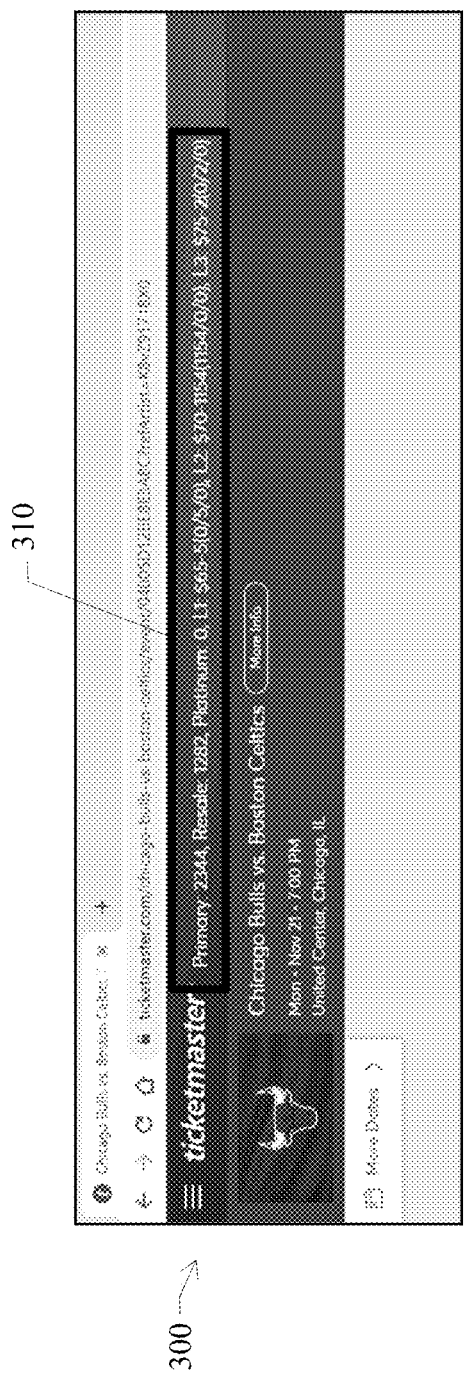
FIG. 4B is another view of the online ticket marketplace depicted in FIG. 4A, according to an example embodiment.

FIGS. 4A and 4B are illustrations of the online ticket marketplace of FIG. 3, namely webpage 300 for the same event, except utilizing aspects of the methods and systems described herein, such as system 100 and/or method 200.

In addition to the current ticket listing provided by the online ticket marketplace with limited information provided to the user, FIGS. 4A and 4B depict a subset of ticket information 310 displayed to the user. In particular, the subset of ticket information 310 is overlaid within the webpage 300. Thus, the additional information provided in the subset of ticket information is readily available to the user viewing the webpage 300.

According to example embodiment, upon the user selecting the webpage 300 via the user's client device (which may be an exemplary input), the subset of ticket information 310 may be generated from a historical database. The historical database may have scraped and stored a set of ticket information relating to the event (i.e., the basketball game in this example), over a period of time. Moreover, the historical database may have aggregated data about the event from at least one other online marketplace beyond the one to which webpage 300 belongs.

In this particular example, the subset of ticket information provides a total number of primary sale tickets available, a total number of resale tickets available, and three tiers of pricing information, directly overlaid into the webpage 300. For example, 2,344 primary tickets are for sale and 1,282 resale (secondary) tickets are for sale. In other events or markets, platinum, premier, or other ticketing tiers may also be represented. In addition to providing a snapshot for the number of tickets available, pricing information is provided, including a price tier and the number of tickets available at that tier, as well as the number of tickets broken down at the pricing tier to the corresponding type of ticket (primary/resale/platinum, for example).

FIGS. 5A-5L are additional illustrations of the online ticket marketplace of FIG. 3 utilizing aspects of the methods and systems described herein, such as method 200 and system 100. While FIGS. 4A and 4B provided one example of how a subset of ticket information may be displayed, FIGS. 5A-5K show a number of other aspects of the disclosure.

Figure 5A:
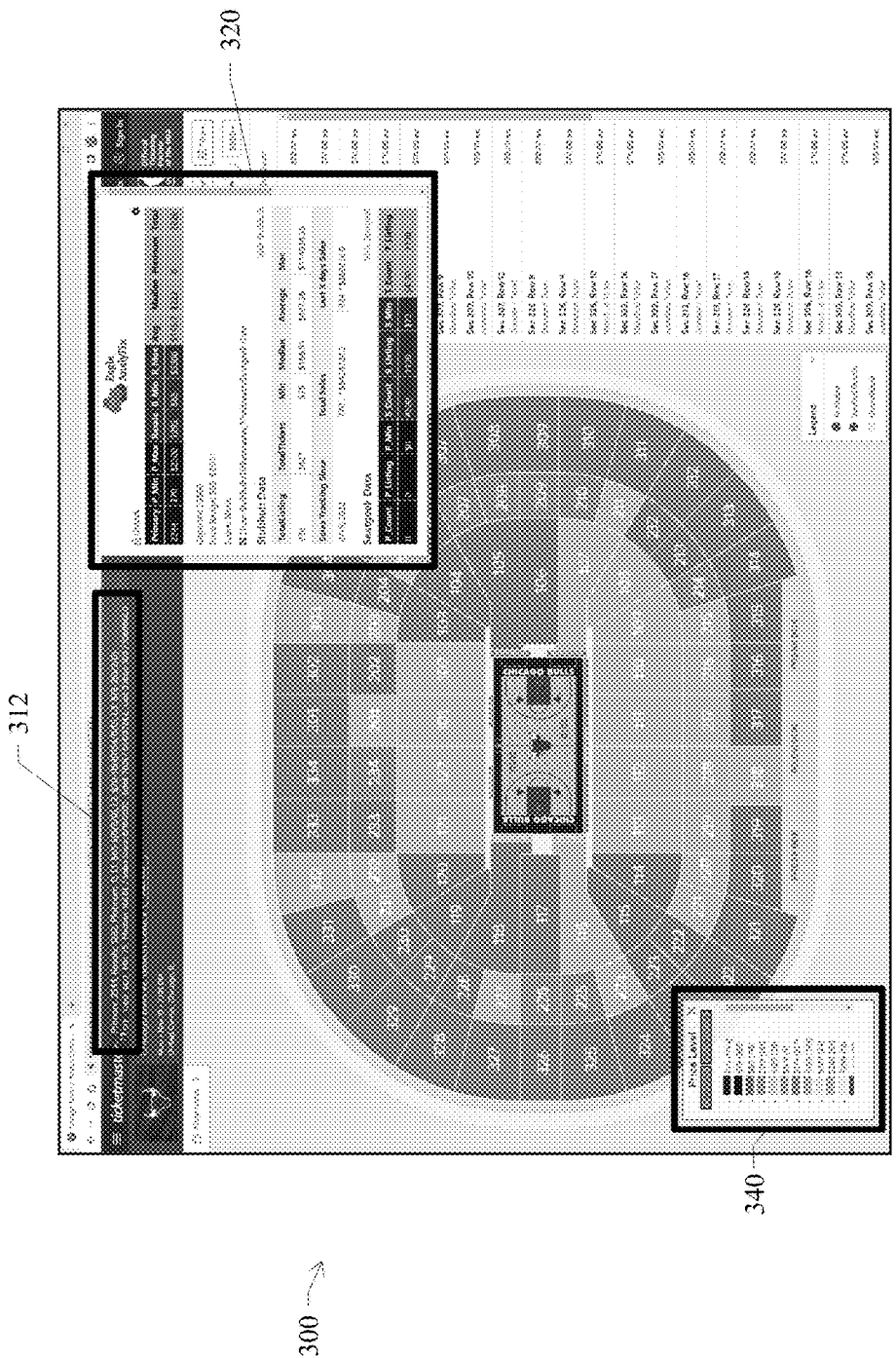
FIG. 5A is an illustration of the online ticket marketplace of FIG. 3 utilizing aspects of the methods and systems described herein, according to an example embodiment.

For example, FIG. 5A depicts webpage 300, with a plurality of subsets of ticket information for the event generated. More particularly, an overlay 312 representing a subset of ticket information is displayed, a dashboard 320 representing another subset of ticket information is displayed, and a price level visualization tool 340 representing yet another subset of ticket information is displayed. Each of these subsets of ticket information are generated using information within the historical database of ticket information.

Figure 5B:
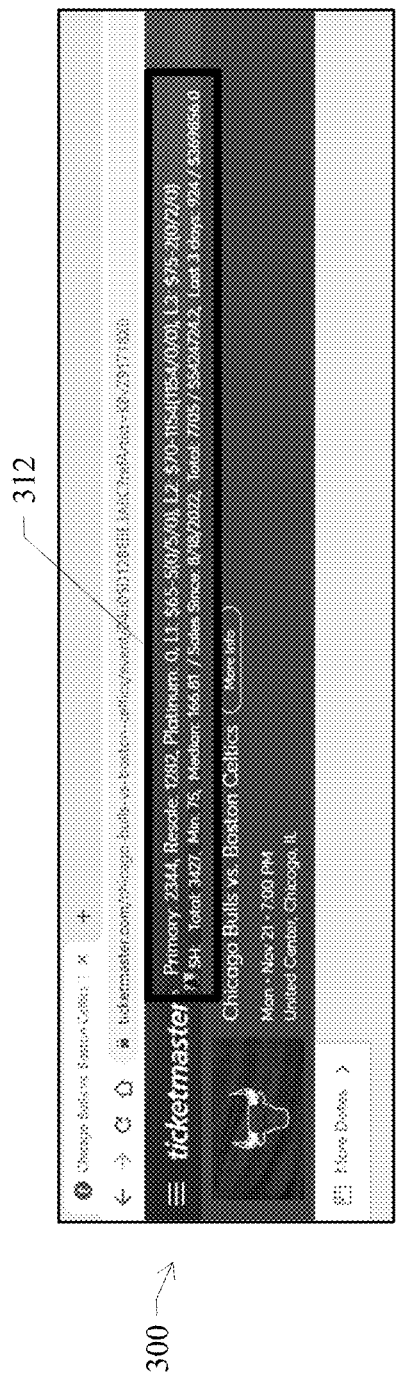
FIG. 5B is another view of the online ticket marketplace depicted in FIG. 5A, according to an example embodiment.

The overlay 312 subset includes the information provided in the subset 310 described in FIGS. 4A-4B, but also displays and provides additional information. For example, as shown in FIG. 5B, the overlay 312 also shows that it is pulling information from "SH" (StubHub) for a new total number of tickets available. Additionally, minimum and median pricing information is displayed. Other information displayed is that the historical database has been tracking this event since Aug. 18, 2022, and provides insight into sales volume and total sales in total, as well as volume and sales over the previous three days. The overlay 312 subset includes a number of pricing parameters and factors that are otherwise not available in the webpage 300.

Figure 5C:
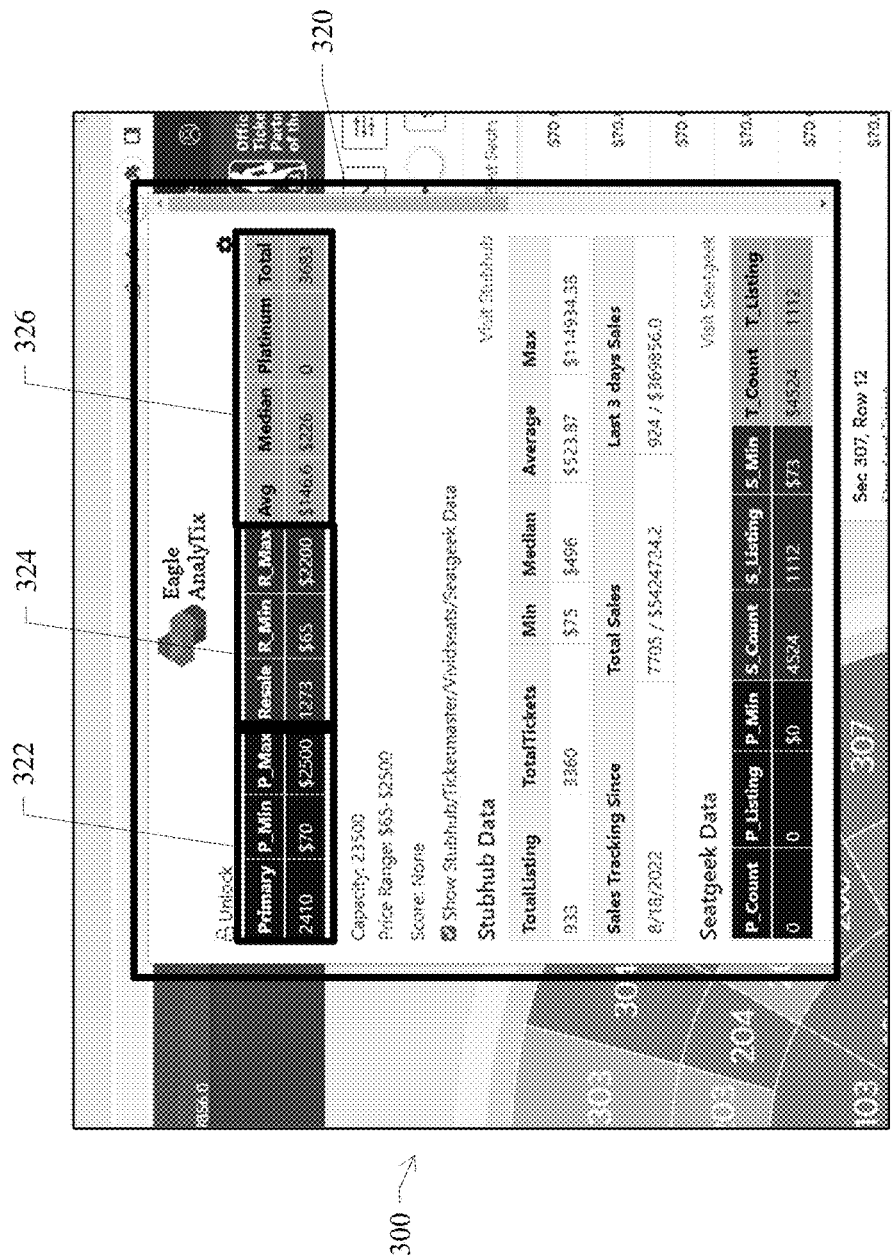
FIG. 5C is another view of the online ticket marketplace depicted in FIG. 5A, according to an example embodiment.

Continuing to FIG. 5C, the dashboard 320 and the subset of ticket information displayed therein, provides additional level of detail. The dashboard 320 provides a first set of ticket and pricing information 322, a second set of ticket and pricing information 324, and a set of pricing summary information 326, for example. As depicted in the example illustrating in FIG. 5B, the first set of ticket and pricing information 322 provides a total number of primary tickets, a minimum ticket price for primary tickets, and a maximum ticket price for primary tickets. Similarly, the second set of ticket and pricing information 324 provides a total number of resale tickets, a minimum ticket price for resale tickets, and a maximum ticket price for resale tickets. In this example, the set of pricing summary information provides average price and a median price for the total number of tickets available.

In other examples, sets of pricing information, or summaries thereof, may include other information. For example, tickets are commonly purchased and sold in sets or packs, such as pairs, sets of three, four, five, or six, for example. As such, the set of pricing information included within the dashboard 320 may include summary information about sets or packs of tickets, such as provided the number of pairs available and the minimum price (or other price data). Other embodiments may include the number of sets of three, four, or another number of tickets listed for sale. In this regard, a user may not only be able see the trends for a single ticket, but also for a grouping of tickets.

Similarly, it should be appreciated that other data, subsets of data, and/or other information may be made available to a user via the dashboard 320 without departing from the scope of this disclosure. For example, the dashboard 320 may include a presale password which may be identified by the system as being applicable to the event selected by the user. The presale password may be a subset of ticket information for the event and provided by the historical database, in some examples. The dashboard 320 may display other information, such as a score or value identifying to a user whether the current listings are trending a certain direction or are above/below historical values (e.g., average prices), and whether listings are worth buying and/or whether the user should list any ticket inventory they have for the given event. In other examples, zone listings or other ticket listing filters may be included as part of the data or subset of data available to the user via the dashboard 320.

In one example, a user may cause a web extension or application to run, which then causes the dashboard 320 to appear to the user viewing the webpage 300 on the client device. The dashboard 320 may allow a user to toggle on and off the inclusion of data from other marketplaces. For example, in the example provided in FIG. 5C, although the webpage 300 is from Ticketmaster, the user may toggle data from other sources, such as StubHub and SeatGeek on and off with a click.

Figure 5D:
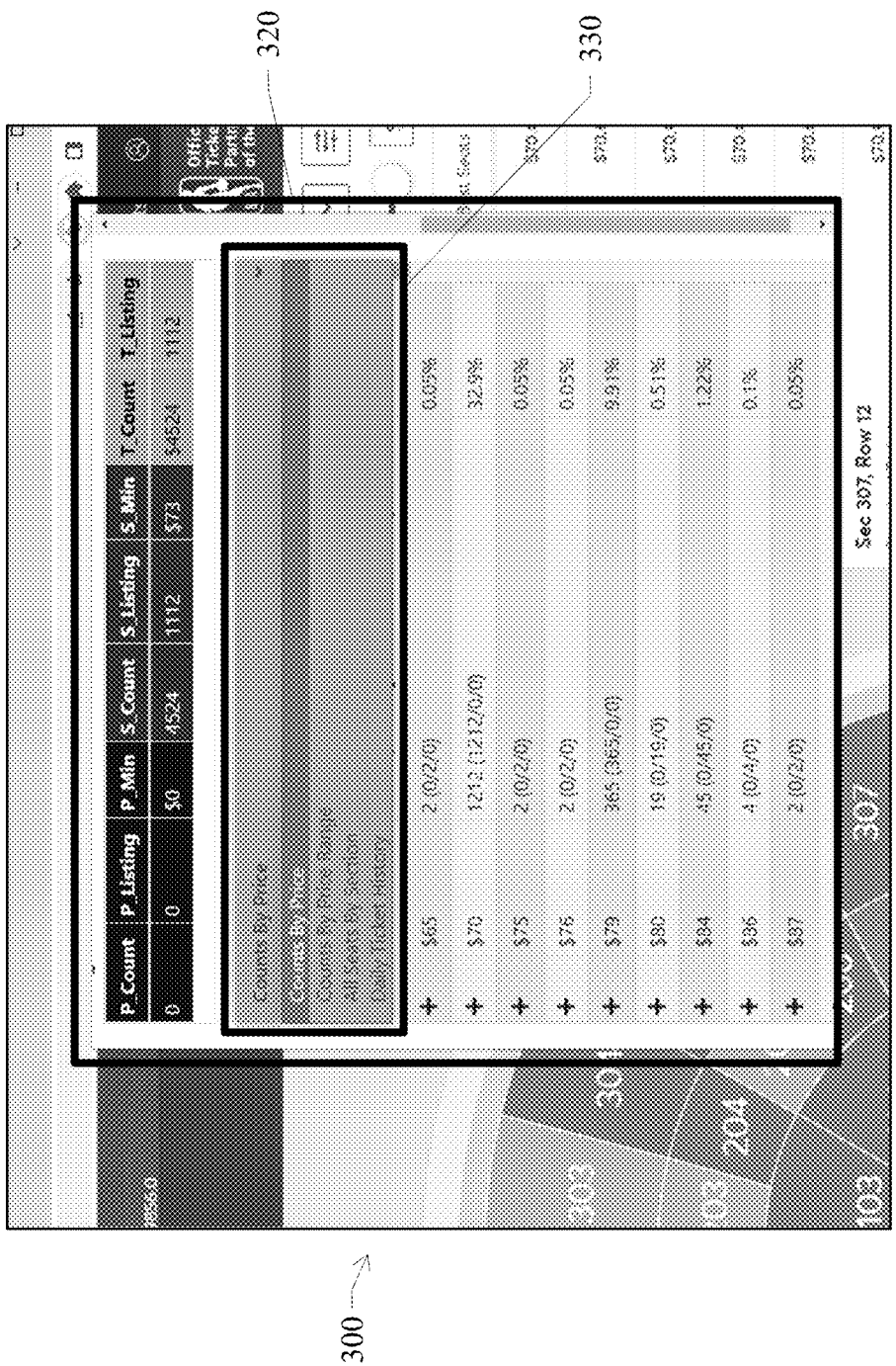
FIG. 5D is another view of the online ticket marketplace depicted in FIG. 5A, according to an example embodiment.

Turning to FIG. 5D, the dashboard 320 also provides a dropdown menu 330 to select one of a variety of subsets of ticket information to display. As shown subsets of information may include ticket counts by price, ticket counts by price range, all seats by section, and a daily ticket history.

Figure 5E:
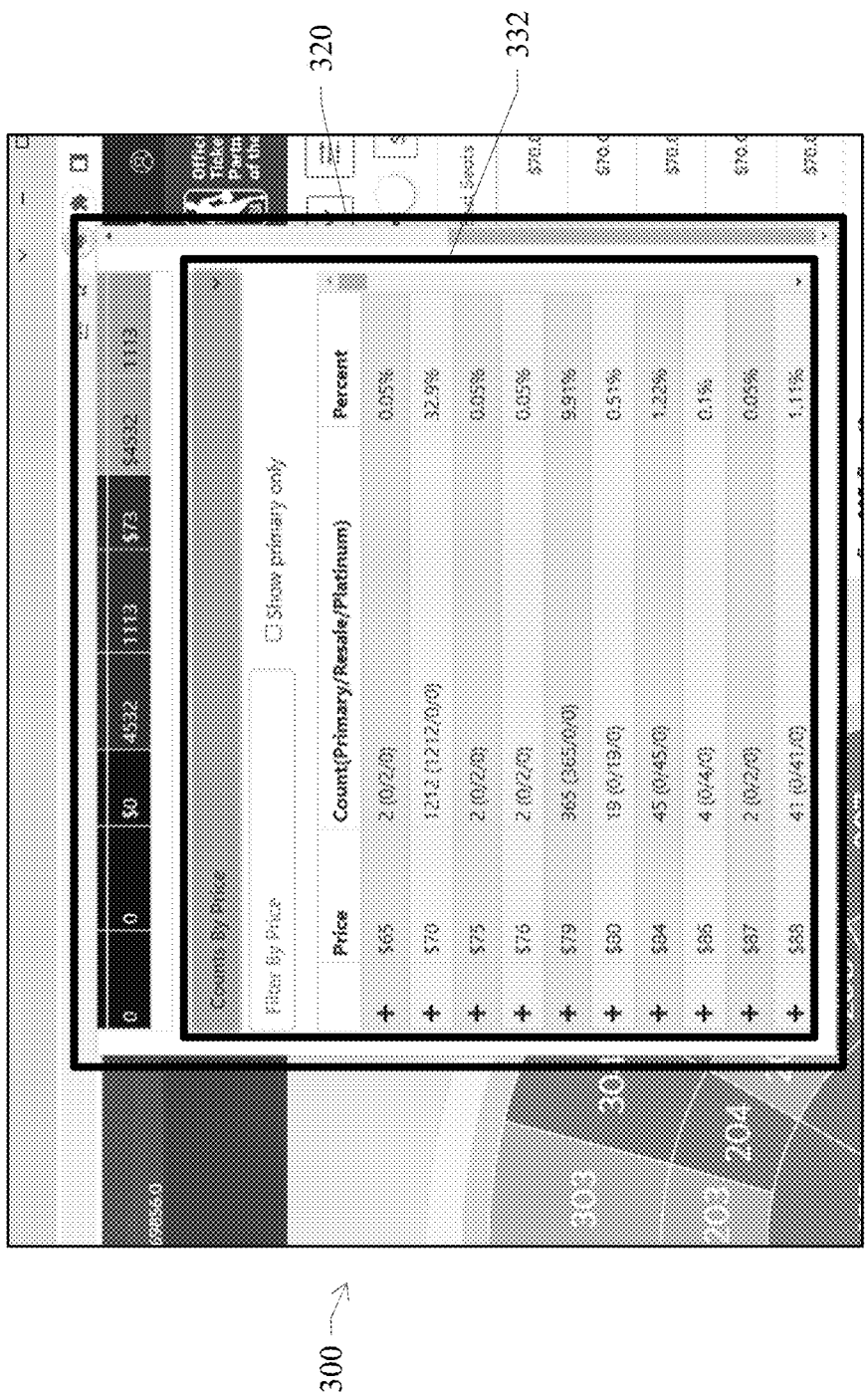
FIG. 5E is another view of the online ticket marketplace depicted in FIG. 5A, according to an example embodiment.

FIG. 5E depicts an example of the ticket count by price subset of ticket information 332. The count by price subset 332 provides a display of a count of the number of tickets at a given price, as well as a break down for the number of primary/resale/platinum tickets at that price. For example, as displayed in FIG. 5E, a user would be informed that there are 1,212 primary tickets priced at $70.

Figure 5F:
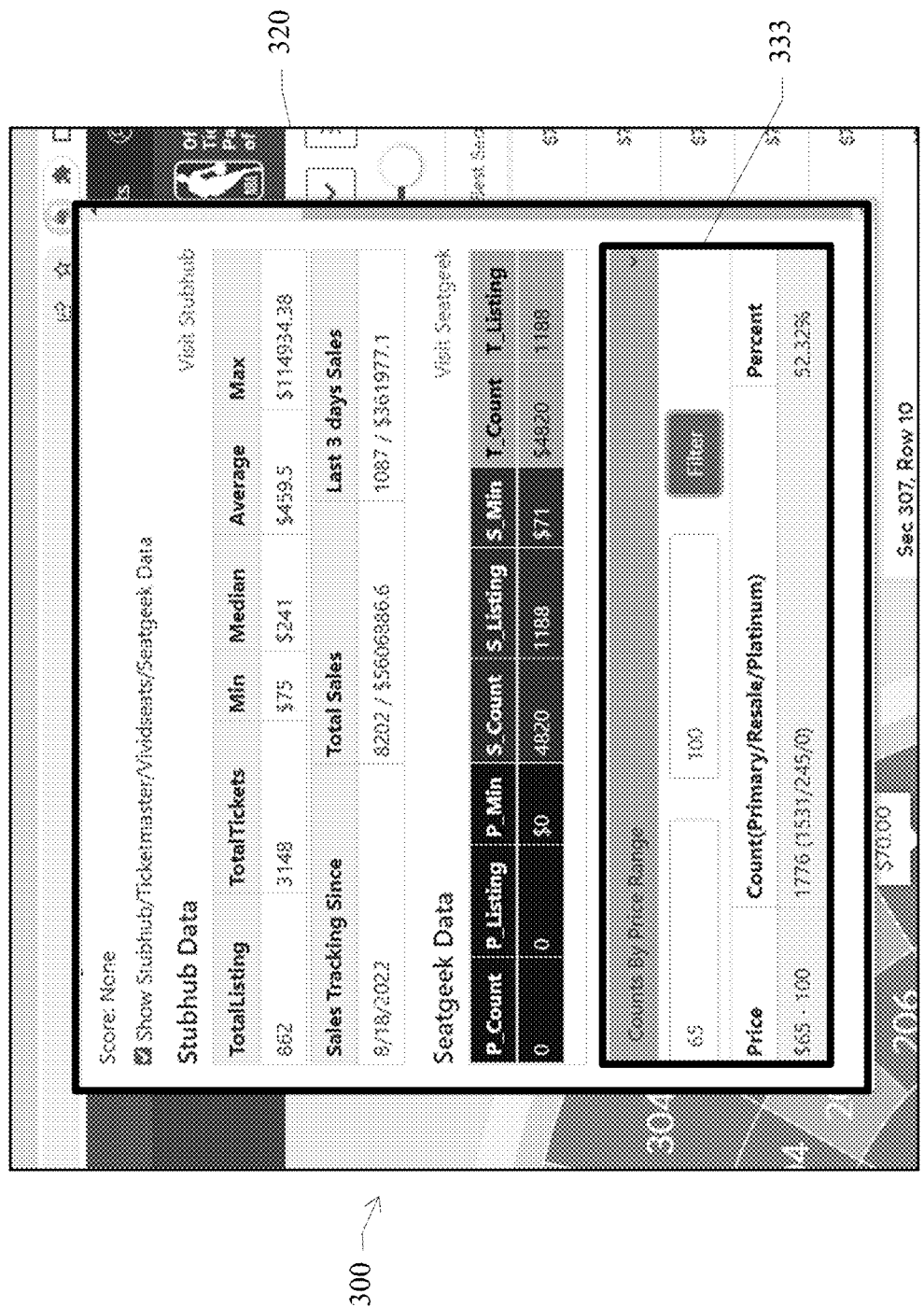
FIG. 5F is another view of the online ticket marketplace depicted in FIG. 5A, according to an example embodiment.

Continuing, FIG. 5F depicts an example of the ticket count by price range subset of ticket information 333. The count by price range subset 333 provides a display of a count of the number of tickets at a price range that the user may input. The count by price range subset 333 also provides a break down for the number of primary/resale/platinum tickets at that price range. For example, as displayed in FIG. 5F, the user requested a count of the number of tickets priced between $65 and $100. The count by price range subset 333 displays to the user that there are 1,776 tickets at that price, and of those 1,776, 1,531 are primary tickets and the other 245 are resale tickets.

Figure 5G:
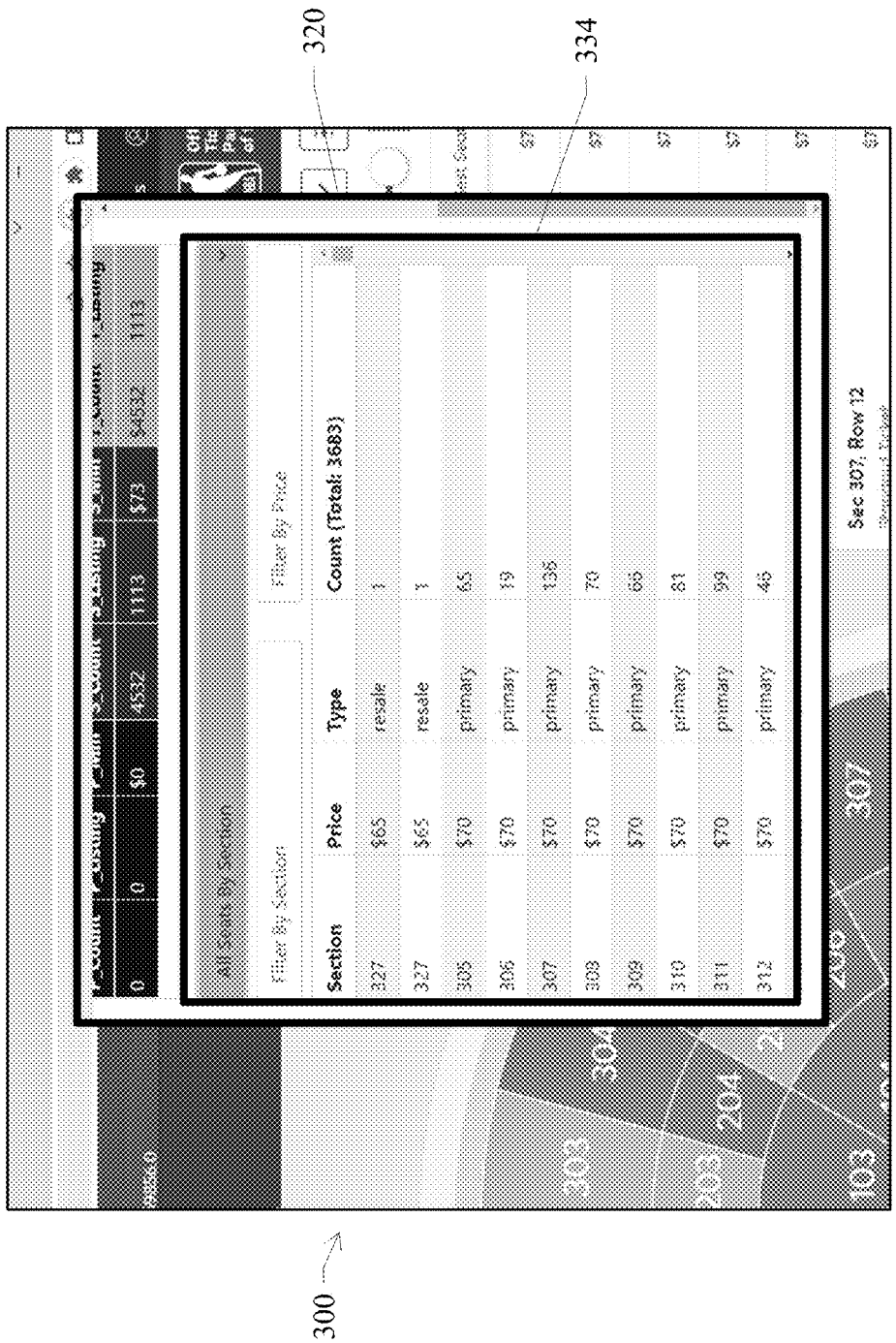
FIG. 5G is another view of the online ticket marketplace depicted in FIG. 5A, according to an example embodiment.

Next, FIG. 5G depicts an example of the all seats by section subset of ticket information 334. The all seats by section subset 334 provides a display of the tickets available per section per price point. For example, as displayed in FIG. 5G, a user would be informed that section 307 has 136 primary tickets priced at $70 per ticket, for example.

Figure 5H:
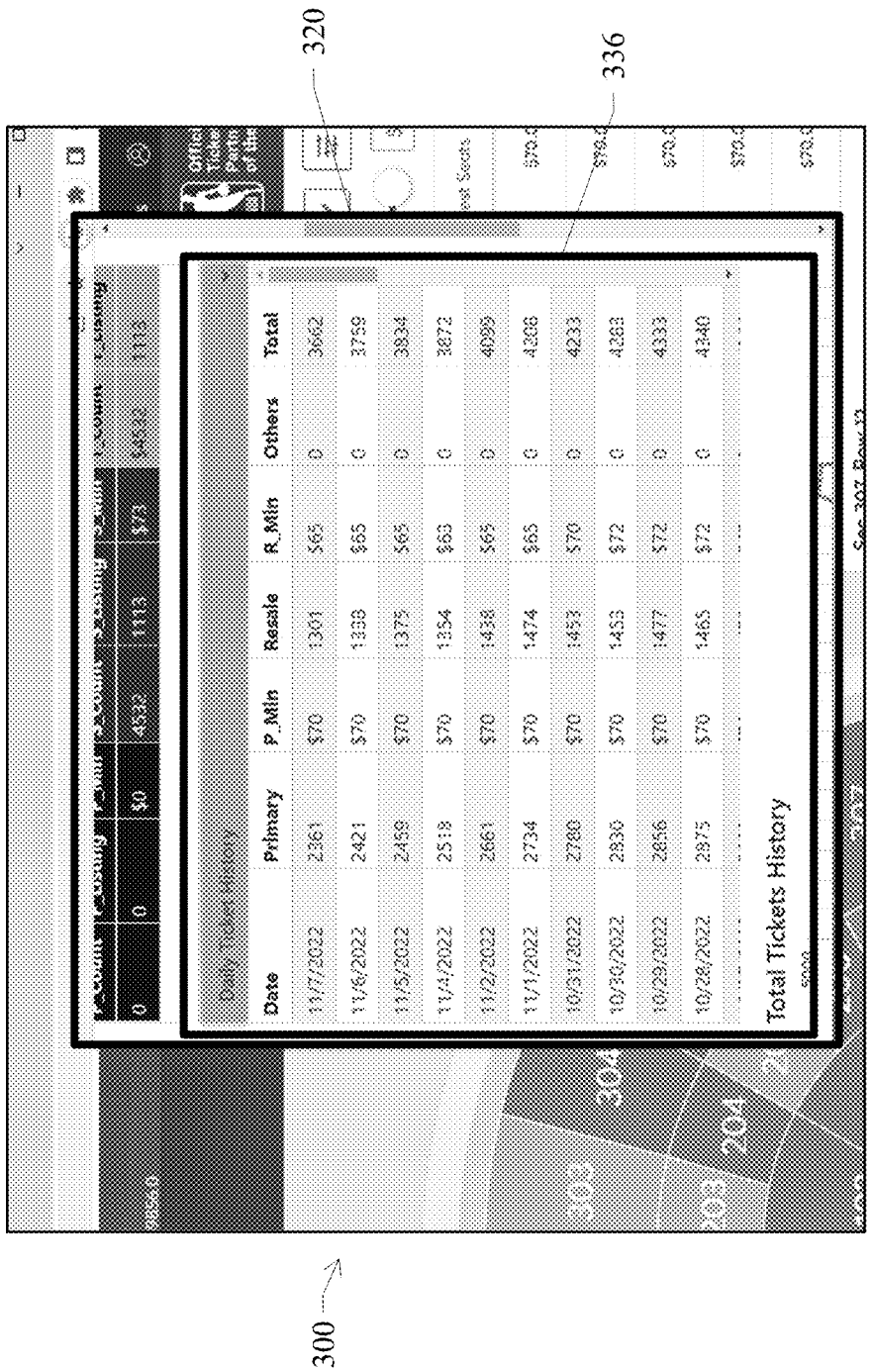
FIG. 5H is another view of the online ticket marketplace depicted in FIG. 5A, according to an example embodiment.
Figure 5I:
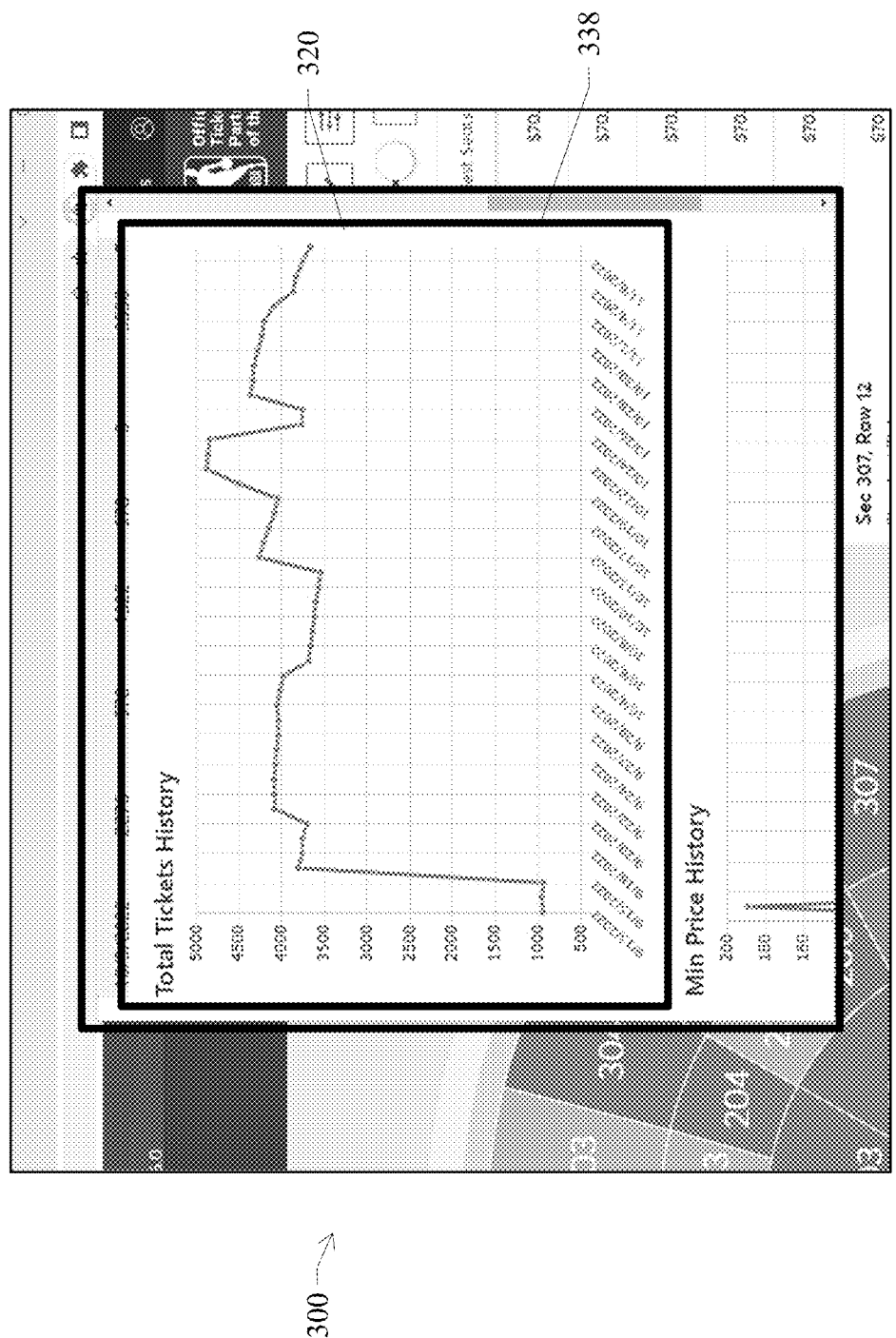
FIG. 5I is another view of the online ticket marketplace depicted in FIG. 5A, according to an example embodiment.
Figure 5J:
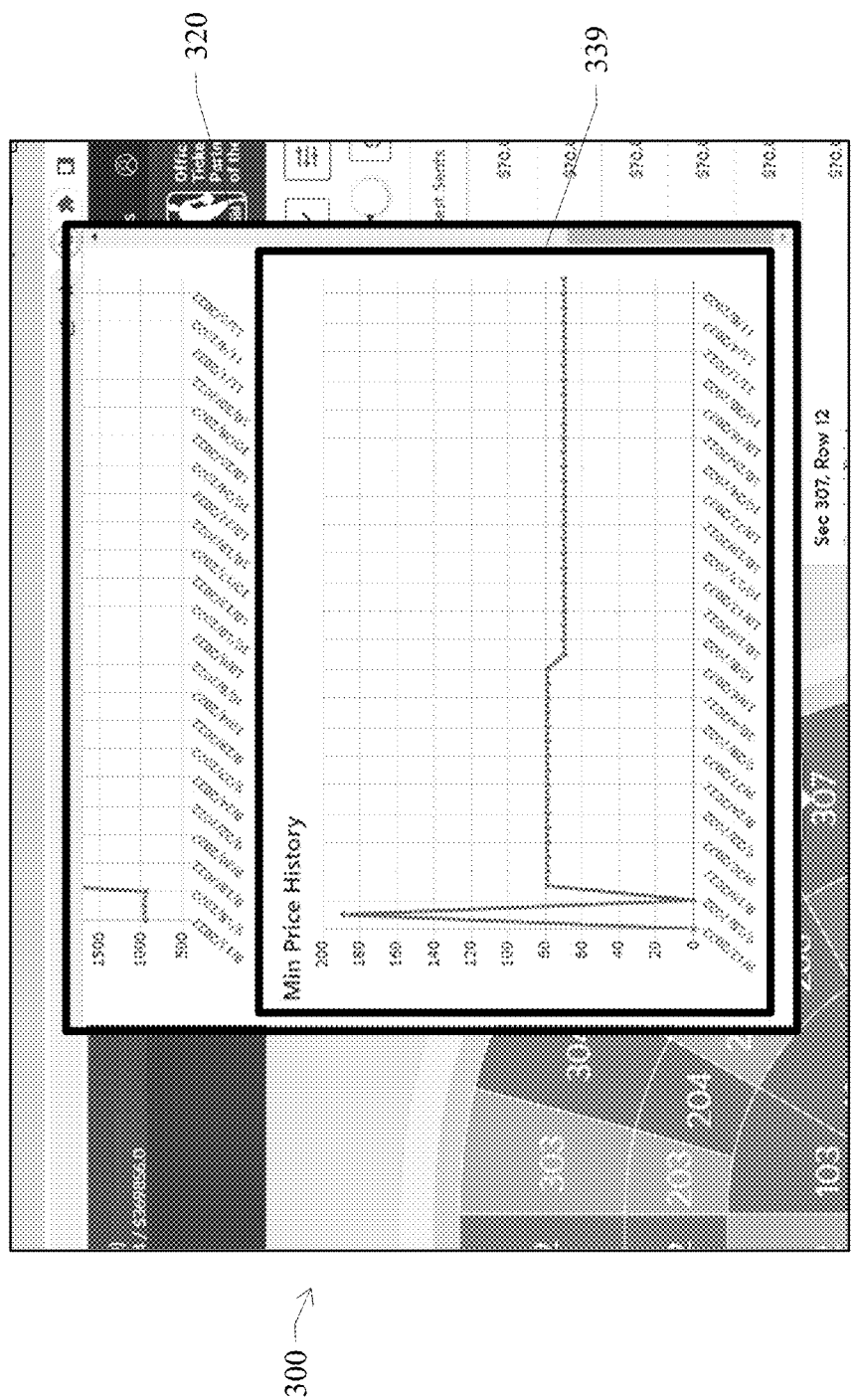
FIG. 5J is another view of the online ticket marketplace depicted in FIG. 5A, according to an example embodiment.

In the last of the example drop down options, FIG. 5H depicts an example of the daily tickets history subset of ticket information 336. The daily ticket history subset 336 provides a display of the total number of tickets available each day. Further, the daily ticket history subset 336 provides a number of primary tickets, a minimum price for the primary tickets, a number of resale tickets, and a minimum price for the resale tickets, for example. As provided in FIG. 5I the daily ticket history subset 336 may be represented and displayed in another format, such as a chart. More particularly, FIG. 5I depicts a total tickets history chart 338 which is a visualization over time for the number of tickets available for the event based on the daily ticket history subset. Similarly, FIG. 5J depicts the minimum price chart 339 providing the minimum price of the available tickets as a function of time, which is another representation of the daily ticket history subset.

It would be apparent to a person of skill in the art that having access to these various subsets of ticket information that are not otherwise regularly accessible would be valuable to a market participant. Such information informs the buying and selling decision, as well as related price points to possibly initiate purchases or sales.

Figure 5K:
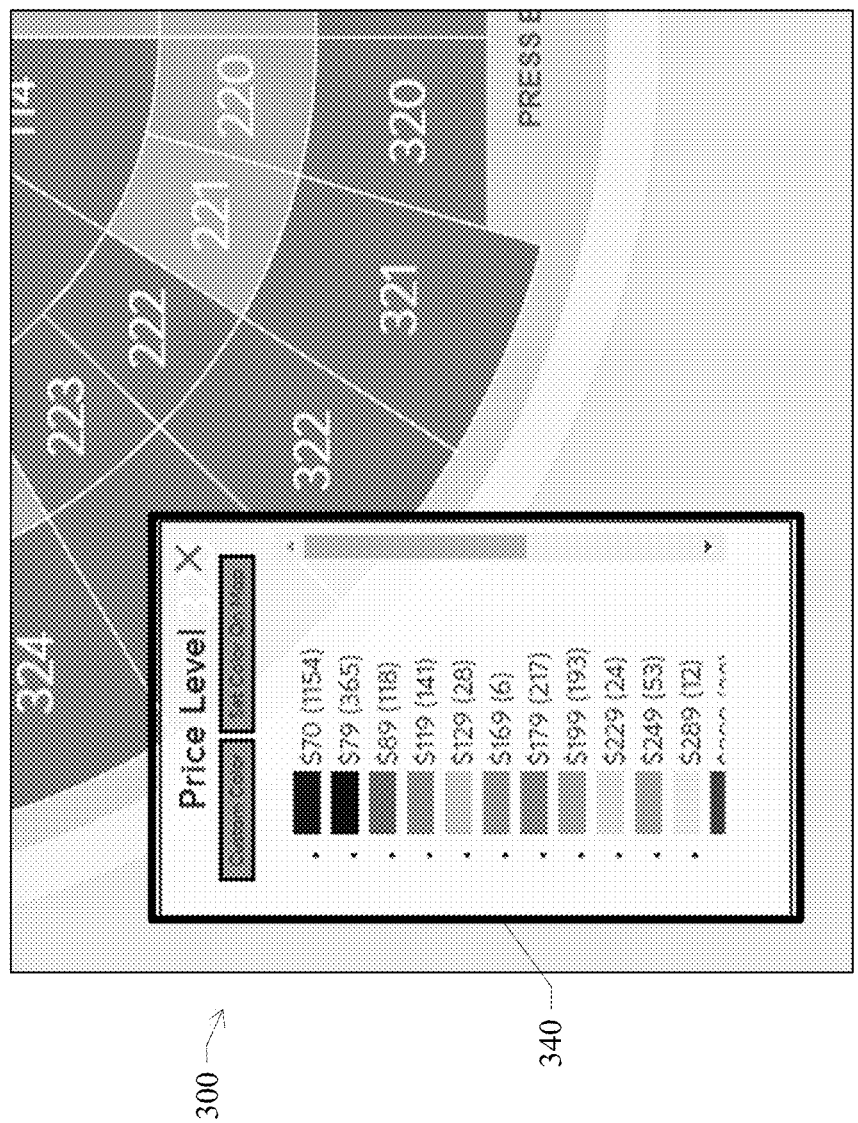
FIG. 5K is another view of the online ticket marketplace depicted in FIG. 5A, according to an example embodiment.
Figure 5L:
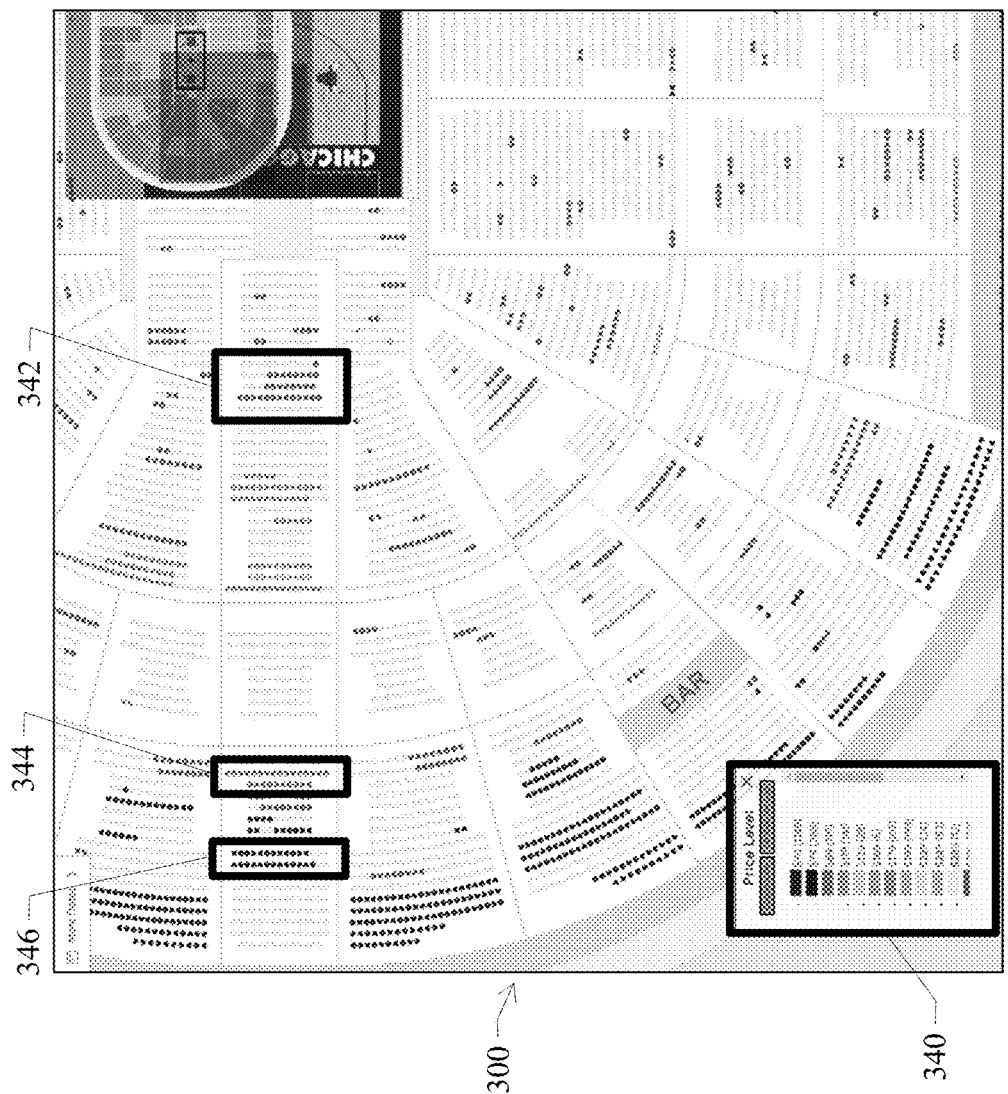
FIG. 5L is another view of the online ticket marketplace depicted in FIG. 5A, according to an example embodiment.

Continuing to FIG. 5K, the price level visualization tool 340. The price level visualization tool 340 color codes price ranges such that pricing information can be conveniently and efficiently displayed to the user. As shown in FIG. 5K, the price level visualization tool 340 may provide a subset of information in the form of a count of tickets per price, and then allow for color coding to be apply to that price. For example, in supported online marketplaces that offer visualization at a ticket by ticket level, the colors of the display can be controlled using the price level visualization tool 340. As shown in FIG. 5L, a first set of tickets 342 may correspond to a first color and first price level, a second set of tickets 344 may correspond to a second color and second price level, and a third set of tickets 346 may correspond to a third color and third price level, for example.

Figure 6:
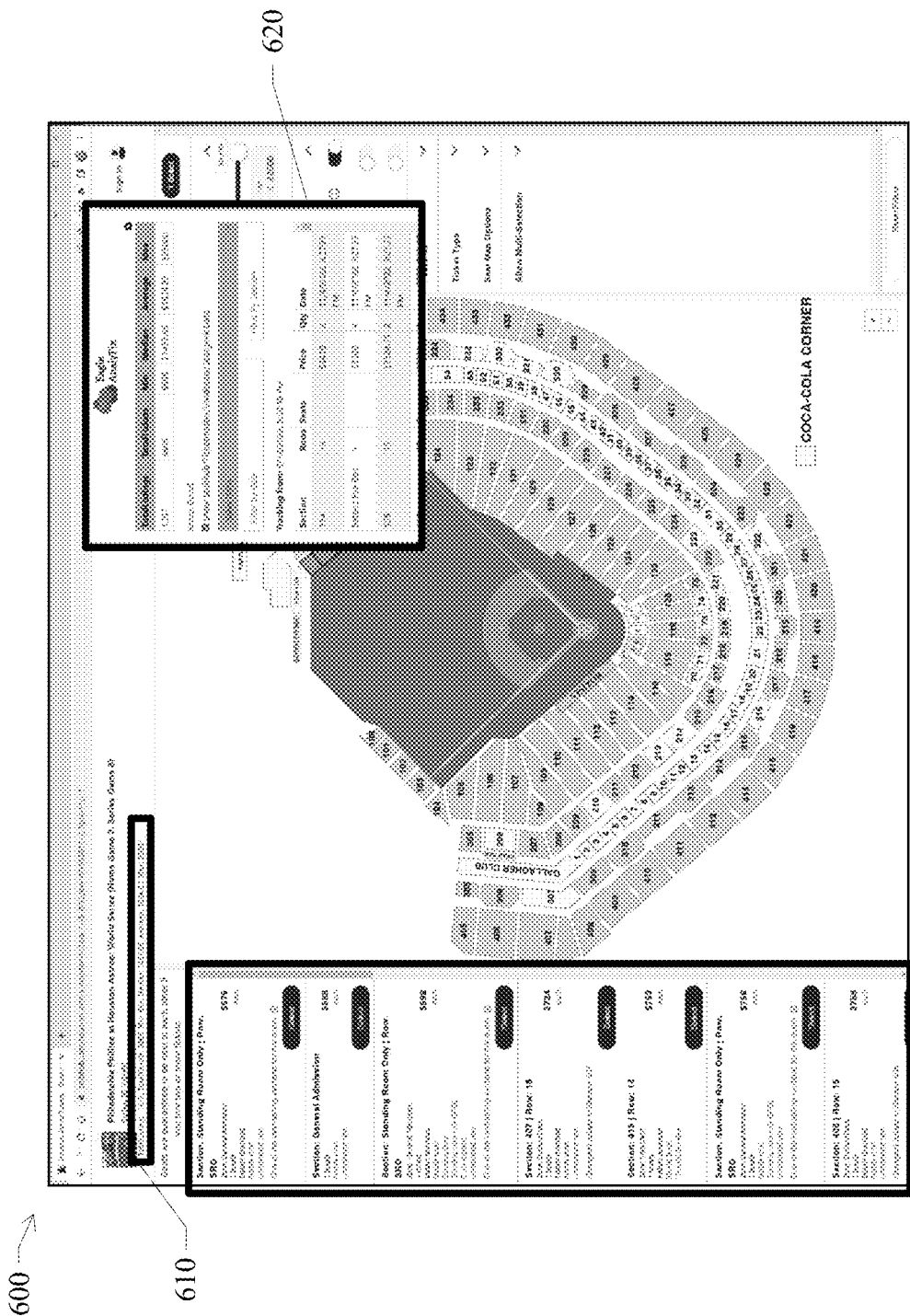
FIG. 6 is an illustration of an online ticket marketplace for an event utilizing aspects of the methods and systems described herein, according to an example embodiment.

FIG. 6 is another illustration of an online ticket marketplace for another event utilizing aspects of the methods and systems described herein, such as method 200 and system 100. In particular, FIG. 6 depicts webpage 600 which corresponds to a baseball game marketplace hosted by StubHub. As illustrated, an overlay subset of ticket information 610, and a dashboard of ticket information 620, similar to those overlaid subsets and dashboards discussed, in addition to a ticket listing 605 provided by StubHub. Again, the overlay subset of ticket information 610 and the dashboard of ticket information 620 may provide information otherwise not displayed or provided to a user in an accessible format.

Figure 7A:
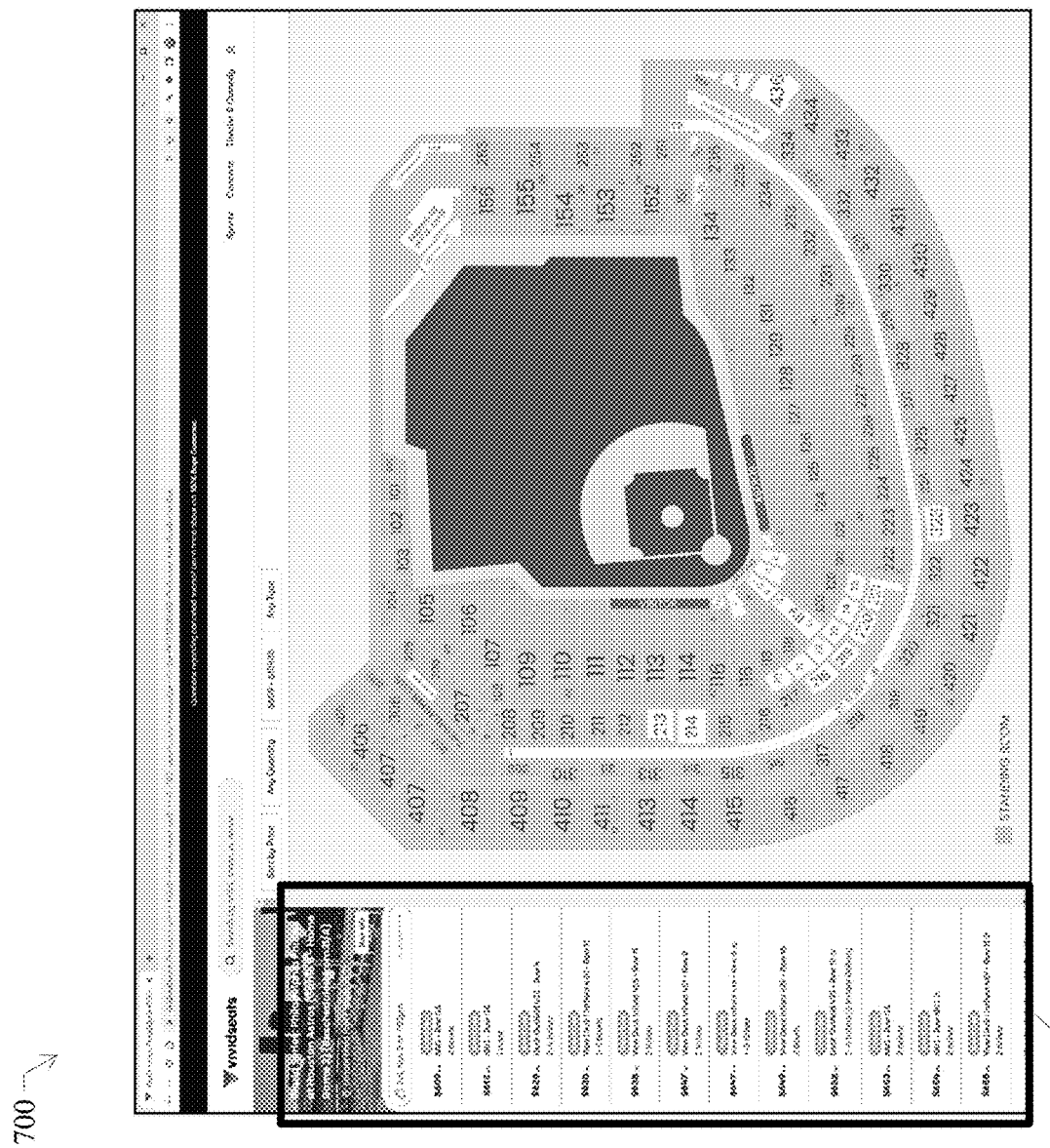
FIG. 7A is an illustration of an online ticket marketplace for an event.

FIG. 7A is an illustration of yet another online ticket marketplace for an event. In particular, FIG. 7A depicts a webpage 700 corresponding to a baseball sporting event. In the example provided, VividSeats is hosting the marketplace for secondary tickets for the event. Before executing aspects of the methods described herein or aspects of the systems provided, the information available to a user is limited to a ticket listing 705. The ticket listing 705 may be filterable and sortable, but otherwise is lacking important market information for the event.

Figure 7B:
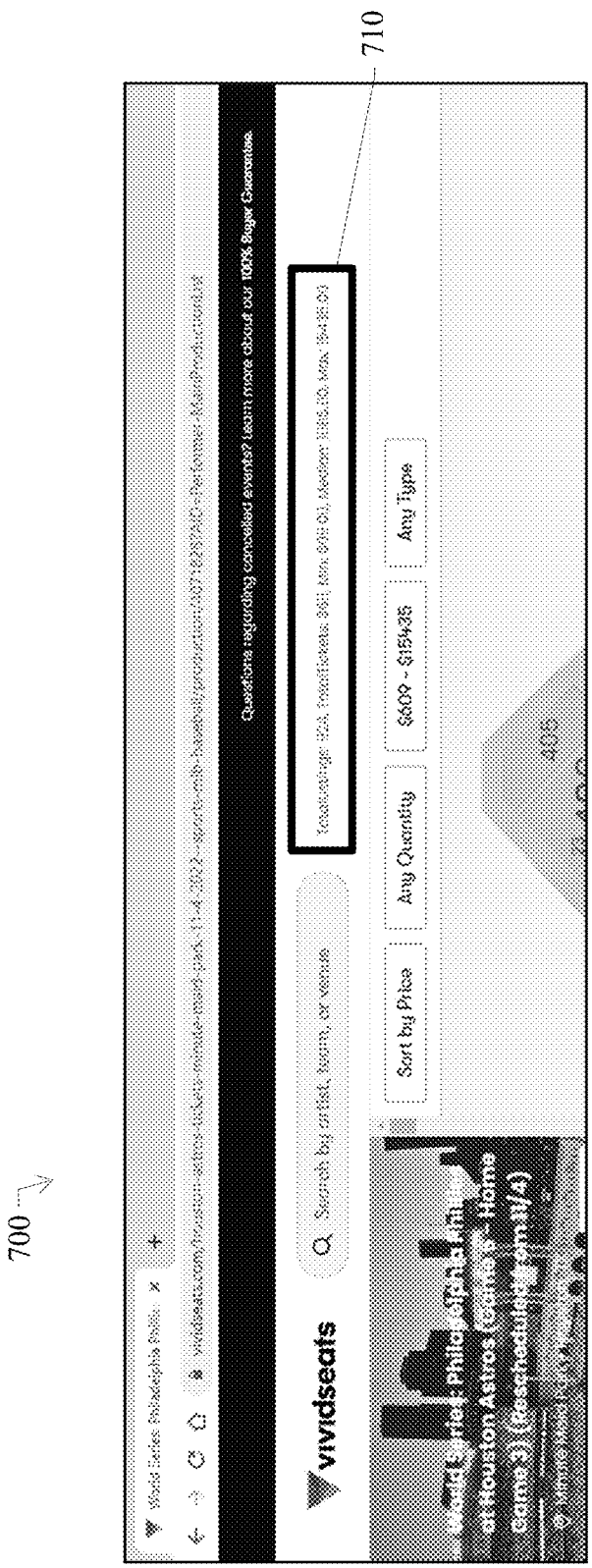
FIG. 7B is an illustration of the online ticket marketplace for an event of FIG. 7A utilizing aspects of the methods and systems described herein, according to an example embodiment.

FIG. 7B is an illustration of the webpage 700 after utilizing aspects of the methods and systems described herein. For example, as depicted in FIG. 7B, a data overlay subset of ticket information 710 is provided within the webpage 700 for ease of access to the user. In this particular example, the data overlay subset of ticket information 710 displays data including the total number of listings for the event, the total number of tickets (one listing may include multiple tickets), a minimum ticket price, a median ticket price, and a maximum ticket price.

As shown by the variation in the Figures discussed, it should be appreciated that the specific subset overlays and dashboards may be customized by the user, by user preference, and based on the online ticket marketplace originally accessed by the user, among other possibilities. For example, it may be beneficial to display different subsets of information for a marketplace that hosts primary and secondary ticket compared to a marketplace that only hosts secondary tickets. Relatedly, each online ticket marketplace may provide or display the set of ticket information differently, and thus, unique procedures for collecting that information, and then generating and displaying subsets of that information may need to be customized for each online ticket marketplace.

IV. Example Variations

The variations described in connection with select examples of the disclosed system and method may be applied to all other examples of the disclosed system and method.

Further, while one or more functions have been described as being performed by or otherwise related to certain devices or entities (e.g., the server 102 or the client 104), the functions may be performed by or otherwise related to any device or entity. As such, any function that has been described as being performed by the server 102 could alternatively be performed by a different server or by the client 104.

Further, the functions need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method of displaying ticket information from a plurality of independent ticket marketplaces comprising:
    scraping, by a server, a first online ticket marketplace for a first set of ticket information relating to an event;
    scraping, by a server, a second online ticket marketplace for a second set of ticket information relating to an event, wherein the second ticket marketplace is independent of the first ticket marketplace;
    storing, by the server, the first and second sets of ticket information;
    generating, by the server, a historical database of ticket information for the event by repeating the scraping and storing steps on a predetermined interval;
    based on an input from a client device, generating, by the server, a subset of ticket information for the event from the historical database of ticket information for the event, wherein the subset of ticket information for the event comprises a set of daily ticket history information, wherein the set of daily ticket history information comprises:
        (i) a number of total tickets available and
        (ii) a set of pricing information;
    overlaying, by a browser extension or an application separate and apart from a webpage stored on a second server, the subset of ticket information for the event comprising data from the first and second sets of ticket information into an overlay on the webpage, wherein the webpage comprises a ticket listing, and the subset of ticket information for the event in the overlay is not available in the webpage, wherein the browser extension or the application is configured to generate the overlay on a plurality of different webpages associated with a plurality of independent websites.

2. The method of claim 1, wherein the overlay comprises ticket information for sets of two or more tickets.

3. The method of claim 2, wherein the overlay comprises color coded price ranges for the sets of two or more tickets.

4. The method of claim 1, wherein displaying the subset of ticket information on the webpage comprises overlaying a representation of the subset of ticket information within the webpage.

5. The method of claim 1, wherein the set of ticket information comprises:
a number of a plurality of tickets for sale on the online ticket marketplace; and
an offered sale price for each ticket of the plurality of tickets for sale.

6. The method of claim 1, wherein the set of ticket information comprises at least one of (i) a ticket section identifier or (ii) a ticket seat identifier, for each ticket of a plurality of tickets for sale on the online ticket marketplace.

7. The method of claim 1, wherein the input from the client device comprises at least one of (i) a ticket preference or (ii) a price preference.

8. The method of claim 1, wherein the subset of ticket information for the event provides ticket pricing information as a function of time.

9. The method of claim 1, further comprising:
based on the input from the client device, scraping the online ticket marketplace for a second set of ticket information; and
based on the input from the client device, storing the second set of ticket information to the historical database.

10. The method of claim 1, wherein at least a portion of the subset of ticket information generated by the server is information not displayed by the online ticket marketplace.

11. The method of claim 1, wherein the subset of ticket information comprises a number of primary market tickets available and a number of secondary market tickets available.

12. The method of claim 1, wherein the subset of ticket information comprises a count of tickets sorted by price.

13. The method of claim 1, wherein the subset of ticket information for the event is configured to be filtered by a section identifier or a price value.

14. The method of claim 1, further comprising:
(c) scraping, by the server, a second online ticket marketplace for a second set of ticket information relating to the event;
(d) storing, by the server, the second set of ticket information; and
generating, by the server, the historical database of ticket information for the event by repeating steps (c) and (d) on a second predetermined interval.

15. A computing system, comprising:
a communication interface;
a processing unit;
a data storage; and
program instructions stored in the at least one data storage, wherein the program instructions are executable by the processing unit to carry out operations comprising:
scraping, by a server, an online ticket marketplace for a set of ticket information relating to an event;
scraping, by a server, a second online ticket marketplace for a second set of ticket information relating to an event, wherein the second ticket marketplace is independent of the first ticket marketplace;
storing, by the server, the set of ticket information;
generating, by the server, a historical database of ticket information for the event by repeating the scraping and storing steps on a predetermined interval;
based on an input from a client device, generating, by the server, a subset of ticket information for the event from the historical database of ticket information for the event, wherein the subset of ticket information for the event comprises a set of daily ticket history information, wherein the set of daily ticket history information comprises:
(iii) a number of total tickets available and
(iv) a set of pricing information; and
overlaying, by a browser extension or an application separate and apart from a webpage stored on a second server, the subset of ticket information for the event comprising data from the first and second sets of ticket information into an overlay on the webpage, wherein the webpage comprises a ticket listing, and the subset of ticket information for the event in the overlay is not available in the webpage, wherein the browser extension or the application is configured to generate the overlay on a plurality of different webpages associated with a plurality of independent websites.

16. A method of displaying ticket information from a plurality of independent ticket marketplaces comprising:
accessing, by a server, an event webpage of a website, wherein the website is one of a set of ticket marketplace websites, wherein the event webpage corresponds to an event, and wherein the event webpage comprises a first set of ticket data associated with the event;
collecting, by the server from a first online ticket marketplace, the first set of ticket data at a first predetermined interval; storing, by the server, the collected first set of ticket data;
collecting, by the server from a second online ticket marketplace, the second set of ticket data at a second predetermined interval, wherein the second ticket marketplace is independent of the first ticket marketplace;
storing, by the server, the collected second set of ticket data;
generating, by the server, a third set of ticket data based on the stored first set of ticket data and the second set of ticket data, wherein the third set of ticket data comprises a set of daily ticket history information, wherein the set of daily ticket history information comprises:
(v) a number of total tickets available and
(vi) a set of pricing information; and
overlaying in an overlay, by a browser extension or an application separate and apart from a webpage stored on a second server, the third set of ticket data from the first and second sets of ticket information into the overlay on the webpage, wherein the webpage comprises a ticket listing, and the third subset of ticket information in the overlay is not available in the webpage, wherein the browser extension or the application is configured to generate the overlay on a plurality of different webpages associated with a plurality of independent websites.

17. The method of claim 16, wherein the first set of ticket data comprises:
a number of a plurality of tickets listed for sale on the event webpage;

a ticket section identifier for each ticket of the plurality of tickets listed for sale; and an offered sale price for each ticket of the plurality of tickets listed for sale.

18. The method of claim 16, wherein displaying the second set of ticket data comprises displaying a representation of a set of pricing ticket information over time.

19. The method of claim 18, wherein the set of pricing information comprises: a number of tickets available per day, and an average ticket price per day.

* * * * *